United States Patent
Priisholm et al.

(10) Patent No.: US 11,725,677 B2
(45) Date of Patent: Aug. 15, 2023

(54) VALVE CONTROLLER AND METHOD OF CONTROLLING A VALVE

(71) Applicant: ALFA LAVAL CORPORATE AB, Lund (SE)

(72) Inventors: Thomas Priisholm, Kolding (DK); Karsten Schack Madsen, Odense C (DK)

(73) Assignee: ALFA LAVAL CORPORATE AB, Lund (SE)

( * ) Notice: Subject to any disclaimer, the term of this patent is extended or adjusted under 35 U.S.C. 154(b) by 0 days.

(21) Appl. No.: 17/049,073

(22) PCT Filed: May 3, 2019

(86) PCT No.: PCT/EP2019/061404
§ 371 (c)(1),
(2) Date: Oct. 20, 2020

(87) PCT Pub. No.: WO2019/215042
PCT Pub. Date: Nov. 14, 2019

(65) Prior Publication Data
US 2021/0239143 A1 Aug. 5, 2021

(30) Foreign Application Priority Data
May 8, 2018 (EP) .................................... 18171138

(51) Int. Cl.
*F15B 19/00* (2006.01)
*F16K 31/124* (2006.01)
*F16K 37/00* (2006.01)

(52) U.S. Cl.
CPC ........ *F15B 19/002* (2013.01); *F16K 31/1245* (2013.01); *F16K 37/0041* (2013.01); *F15B 2211/6336* (2013.01)

(58) Field of Classification Search
CPC ............ F15B 19/002; F15B 2211/6336; F16K 31/1245; F16K 37/0041
See application file for complete search history.

(56) References Cited

U.S. PATENT DOCUMENTS

| 7,032,878 | B2 | 4/2006 | Coura et al. |
| 9,303,786 | B2 | 4/2016 | Le Moing et al. |
| (Continued) | | | |

FOREIGN PATENT DOCUMENTS

| CN | 101893122 A | 11/2010 |
| CN | 102853153 A | 1/2013 |
| (Continued) | | |

OTHER PUBLICATIONS

"Alfa Laval Unique Control for Butterfly Valve", Intelligent Reliability, Alfa Laval, 4 pages, Jul. 2016.
(Continued)

*Primary Examiner* — Angelisa L. Hicks
(74) *Attorney, Agent, or Firm* — Buchanan Ingersoll & Rooney PC

(57) ABSTRACT

A valve controller for a valve that comprises an actuator mechanically coupled to at least one flow controlling element. The valve controller comprises at least one pilot valve for controlling the position of the flow controlling element(s) by the actuator. The valve controller comprises a position sensor for obtaining a position signal indicative of the position of one of said at least one flow controlling element. The valve controller is configured to execute a configuration phase comprising establishing a pilot valve integer corresponding to number of pilot valves, and determining a tolerance criterion for the position signal based on the pilot valve integer. A valve arrangement comprising the valve controller and a valve. A method of controlling a valve comprising the configuration phase.

14 Claims, 8 Drawing Sheets

(56) References Cited

U.S. PATENT DOCUMENTS

| | | | | |
|---|---|---|---|---|
| 9,835,265 | B2* | 12/2017 | Kucera | F16K 37/0041 |
| 2009/0306830 | A1* | 12/2009 | Cummings | G05B 23/0283 |
| | | | | 700/282 |
| 2010/0294965 | A1 | 11/2010 | Kleegrewe | |
| 2013/0000753 | A1 | 1/2013 | Penning et al. | |

FOREIGN PATENT DOCUMENTS

| | | |
|---|---|---|
| CN | 104329509 A | 2/2015 |
| CN | 109416136 A | 3/2019 |
| EP | 0 947 901 A2 | 10/1999 |
| EP | 3112733 A1 | 1/2017 |
| EP | 3141971 A1 | 3/2017 |
| EP | 3141973 A1 | 3/2017 |
| WO | 2017042360 A1 | 3/2017 |
| WO | 2017121554 A1 | 7/2017 |
| WO | 2017147846 A1 | 9/2017 |

OTHER PUBLICATIONS

International Search Report (PCT/ISA/210) and Written Opinion (PCT/ISA/237) dated May 20, 2019, by the European Patent Office as the International Searching Authority for International Application No. PCT/EP2019/061404.

English Translation of the First Office Action dated Nov. 26, 2021, by the National Intellectual Property Administration, P.R. China in corresponding Chinese Patent Application No. 201980030818.9. (12 pages).

* cited by examiner

VALVE CONTROLLER AND METHOD OF CONTROLLING A VALVE

TECHNICAL FIELD

The present invention generally relates to controlling of fluid valves and valve controllers therefore as well as deployment thereof in industrial environments, and in particular to techniques for facilitating configuration and installation of fluid valves and valve controllers.

BACKGROUND

There are many different types of fluid valves that are deployed in various industrial applications. Such fluid valves include seat valves of both single-seat type and double-seat type, as well as membrane valves, butterfly valves etc. The fluid valves may be designed as on-off valves, changeover valves, mixing valves, pressure regulating valves, control valves, sampling valves, etc. The fluid valves may also be equipped with seat-lift functions to facilitate cleaning, which gives rise to further alternative configurations of the fluid valves.

In industrial applications, fluid valves are arranged to influence and control a process in a targeted manner, e.g. in a process plant. The process plant may thus involve a large number of fluid valves, and each fluid valve may need to be precisely controlled to perform a specific task at a specific time. It may also be vital to identify faulty fluid valves in a timely manner. These objectives require some form of process control.

For process control, it is common to electrically connect the fluid valves into a control network, in which a main controller operates to control the operation of the fluid valves, possibly based on data retrieved from the fluid valves as well as from other components such as sensors included in the control network. To reduce the demand on the main controller, it is known to provide each fluid valve with a valve controller which is connected to the fluid valve so as to control its operation based on commands or control signals from the main controller. Thus, the valve controller includes at least some form of intelligence, by it being operable to recognize and act on the control signals.

For timely detection of faults, the valve controllers may be configured to run a self-diagnostic test during their regular operation and inform the main controller whenever an error condition is detected. During the self-diagnostic test, the valve controller may evaluate one or more validation criteria that are relevant for fault detection in the valve that are being operated by the valve controller. Certain of these validation criteria may be specific to a particular valve type. The use of type-specific validation criteria may make the configuration and installation of the valve controllers more cumbersome for the operator of the control network, so as to ensure that each valve controller operates with the proper validation criteria. One relevant validation criteria relates to evaluation of if the valve is in a desired state as requested by the main controller. For example, it is important to evaluate if the valve is in an open state, a closed state or a seat-lift state as requested by the main controller. This evaluation can be performed by determining the position of a valve disc cooperating with a valve seat.

The difficulty of ensuring that the valve controller operates with a proper validation criterion may be particularly pronounced if the valve controller is generic in the sense that one and the same valve controller may be used with different types of valves. Such a valve controller is e.g. marketed by Alfa Laval under the trademark ThinkTop®.

EP3141971A1 discloses a valve controller for a valve comprising pilot valves for controlling the position of valve discs and sensors providing sensor readings indicative of the position of the valve discs. Sensor readings obtained when the valve discs are brought into different positions by the pilot valves are stored as setup parameters. The setup parameters may be used in subsequent operation of the valve for verifying that the valve operates as intended.

EP3112733A1 discloses a valve controller for a valve configured to execute a configuration phase where a flow controlling element having a valve disc is set in a first and a second predefined state. A first and a second nominal position value indicative of the position of the flow controlling element are acquired when the flow controlling element is in the first and second predefined states, respectively. Based on the first and second nominal position values, the valve is assigned to a valve type and a validation criterion is selected based on the valve type. The validation criterion defines an acceptable range of position values for the flow controlling element while being in one of the first and second predefined states.

SUMMARY

It is an objective of the invention to improve the prior art.

Another objective is to facilitate the procedure of configuring a valve controller for controlling a valve.

Yet another objective is increase the reliability of the procedure of configuring a valve controller for controlling a valve.

A further objective is to provide an alternative to the prior art.

One or more of these objectives, as well as further objectives that may appear from the description below, are at least partly achieved by a valve controller, a valve arrangement comprising a valve controller and a method of controlling a valve according to the independent claims, embodiments thereof being defined by the dependent claims.

A first aspect is a valve controller for a valve that comprises an actuator mechanically coupled to at least one flow controlling element. The valve controller comprises at least one pilot valve for controlling the position of the flow controlling element(s) by energizing the actuator by allowing a pressurized fluid to enter the actuator and de-energizing the actuator by allowing the pressurized fluid to leave the actuator. The valve controller comprises a position sensor for obtaining a position signal indicative of the position of one of said at least one flow controlling element. The valve controller is further configured to execute a configuration phase comprising establishing a pilot valve integer corresponding to number of pilot valves, and determining a tolerance criterion for the position signal based on the pilot valve integer. The valve controller is able to perform a self-configuration. The tolerance criterion is automatically selected. By basing the tolerance criterion on the pilot valve integer, the configuration of the valve controller is facilitated and simplified. The pilot valve integer may correspond to a number of said at least one pilot valve.

In one embodiment, the configuration phase comprises controlling the position of the flow controlling element(s) by means of said at least one pilot valve to set the flow controlling element(s) in a plurality of predefined states, and acquiring, from the position signal, while the flow controlling element(s) is in at least two of the predefined states, a nominal position value for each of said at least two of the predefined states.

In one embodiment, the tolerance criterion defines an acceptable range of position values for the flow controlling element(s), as given by the position signal, while the flow controlling element(s) is in one of the predefined states.

In one embodiment, the acceptable range of position values has a predefined relation to one of the nominal position values, and the valve controller is configured to set the acceptable range of position values in the predefined relation to said one of the nominal position values.

In one embodiment, the determination of a tolerance criterion comprises, if the pilot valve integer is larger than one, selecting a primary tolerance criterion.

In one embodiment, the determining of a tolerance criterion comprises, if the pilot valve integer is one, assigning, based on a first nominal position value and a second nominal position value of the acquired nominal position values, the valve to a valve type among a group of valve types and selecting a secondary tolerance criterion for the valve based on said valve type.

In one embodiment, the selection of the secondary tolerance criterion comprises, if the valve is of a first valve type, selecting a first tolerance criterion, and, if the valve is of a second valve type, selecting a second tolerance criterion.

In one embodiment, the first nominal position value is acquired while said one of said at least one flow controlling element is in a first predefined state, and the second nominal position value is acquired while said one of said at least one flow controlling element is in a second predefined state.

In one embodiment, the valve controller comprises a control unit connected to the position sensor and said at least one pilot valve. The control unit of the valve controller may be configured to execute the configuration process. The control unit may be configured to set the acceptable range of position values in the predefined relation to said one of the nominal position values. The control unit may comprise a data processor. The data processor of the control unit may be configured to execute the configuration process. The data processor may be configured to set the acceptable range of position values in the predefined relation to said one of the nominal position values.

In one embodiment, the pilot valve integer corresponds to the number of enabled pilot valves. The number of said at least one pilot valve may be the number of said at least one pilot valve that is/are enabled. In case of one or more unenabled pilot valves, i.e. if any or more of said at least one pilot valve is/are unenabled, the pilot valve integer may correspond to the number of enabled pilot valves. In other words, if any or some of said at least one pilot valve is/are unenabled and any or some of said at least one pilot valve is/are enabled, the pilot valve integer may correspond to the number of enables pilot valves, i.e. the number of said at least one pilot valve that is/are enabled.

In one embodiment, the valve controller is configured to receive a valve control signal for controlling a fluid flow through the valve and to generate a status signal, and the valve controller is further configured to, subsequent to the configuration phase, perform a flow control phase comprising controlling the actuator based on the valve control signal, controlling the position of the flow controlling element(s) to set the flow controlling element(s) in one of the predefined states based on the valve control signal, evaluating the tolerance criterion, and generating the status signal to indicate an error status if the validation criterion is violated. The control unit of the valve controller may be configured to receive the valve control signal for controlling a fluid flow through the valve and to generate the status signal. The control unit may be configured to perform the flow control phase. The data processor of the control unit may be configured to receive the valve control signal for controlling a fluid flow through the valve and to generate the status signal. The data processor may be configured to perform the flow control phase.

In one embodiment, the valve controller comprises at least one pilot valve detection circuitry for establishing the pilot valve integer.

A second aspect is a valve arrangement comprising the valve controller above and a valve. The valve comprises a valve housing, at least one inlet opening on the valve housing, at least one outlet opening on the valve housing, a fluid channel defined in the valve housing to extend between the at least one inlet opening and the at least one outlet opening, at least one flow controlling element arranged for movement in the fluid channel, and an actuator mechanically coupled to the flow controlling element(s) and being directly or indirectly controlled by the valve controller to move the flow controlling element(s) in the fluid channel so as to control a fluid flow through the valve housing between the at least one inlet opening and the at least one outlet opening.

A third aspect is a method of controlling a valve that comprises at least one flow controlling element mechanically coupled to an actuator and a valve controller comprising at least one pilot valve for controlling the position of the flow controlling element(s) by energizing the actuator by allowing a pressurized fluid to enter the actuator and de-energizing the actuator by allowing the pressurized fluid to leave the actuator, the valve controller comprising a position sensor for obtaining a position signal indicative of the position of one of said at least one flow controlling element. The method comprises a configuration phase comprising establishing a pilot valve integer corresponding to number of pilot valves, and determining a tolerance criterion for the position signal based on the pilot valve integer.

In one embodiment of the method, the configuration phase comprises controlling the position of the flow controlling element(s) by means of said at least one pilot valve to set the flow controlling element(s) in a plurality of predefined states, and acquiring, from the position signal, while the flow controlling element(s) is in at least two of the predefined states, a nominal position value for each of said at least two of the predefined states.

Any one of the above-identified embodiments of the first aspect may be adapted and implemented as an embodiment of the second to third aspects to attain the corresponding advantages and effects.

Still other objectives, features, aspects and advantages of the invention will appear from the following detailed description, from the attached claims as well as from the drawings.

DRAWINGS

Embodiments of the invention will now be described in more detail, by way of example, with reference to the accompanying schematic drawings.

DETAILED DESCRIPTION

Figure 1:
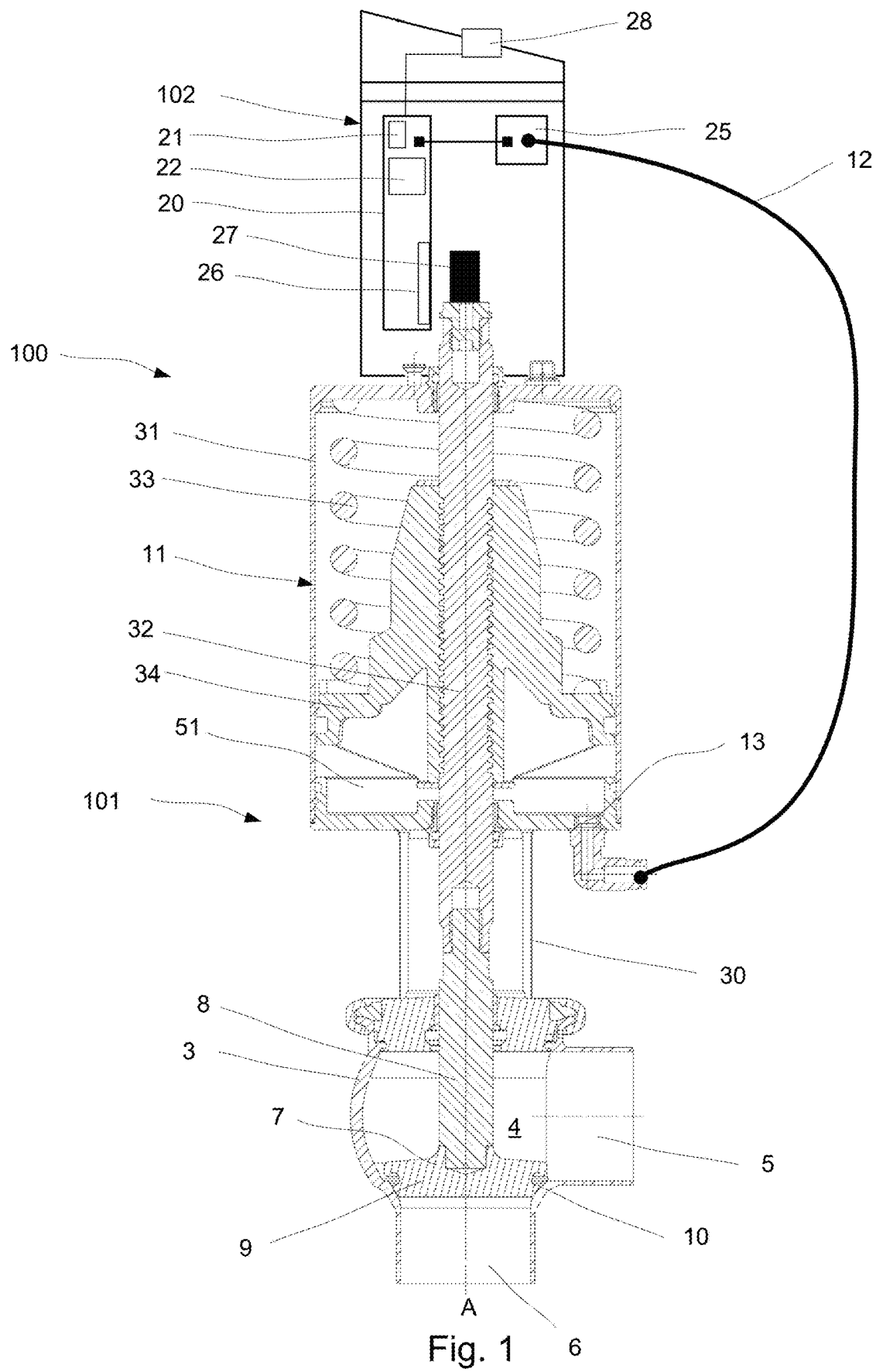
FIG. 1 is a cross sectional view of a valve arrangement that includes a valve controller and a linear single seat valve having two states.

FIGS. 1-5 illustrate valve arrangements 100, 200, 300, 400. The valve arrangements 100, 200, 300, 400 comprise a valve 101, 201, 301, 401 and a valve controller 102, 202, 302, 402. The valve 101, 201, 301, 401 comprises a valve housing 3, at least one inlet opening 5 on the valve housing 3 and at least one outlet opening 6 on the valve housing 3. The valve 101, 201, 301, 401 comprises a fluid channel 4 defined in the valve housing 3 to extend between the at least one inlet opening 5 and the at least one outlet opening 6. The valve 102, 202, 302, 402 comprises at least one flow controlling element 7 arranged for movement in the fluid channel 4. The valve 101, 201, 301, 401 comprises an actuator 11 mechanically coupled to the flow controlling element(s) 7 and being directly or indirectly controlled by the valve controller 102, 202, 302, 402 to move the flow controlling element(s) 7 in the fluid channel 4 so as to control a fluid flow through the valve housing 3 between the at least one inlet opening 5 and the at least one outlet opening 6.

The valve controller 102, 202, 302, 402 comprises at least one pilot valve 25, 37, 72 for controlling the position of the flow controlling element(s) 7 by energizing the actuator 11 by allowing a pressurized fluid to enter the actuator 11 and de-energizing the actuator 11 by allowing the pressurized fluid to leave the actuator 11. The valve controller 102, 202, 302, 402 also comprise a position sensor 26 for obtaining a position signal POS indicative of the position of one of said at least one flow controlling element 7. The valve controller 102, 202, 302, 402 may be integrated with the valve 101, 201, 301, 401 or implemented as a separate component for attachment onto an upper portion of the valve 101, 201, 301, 401.

The valve arrangement 100 shown in FIG. 1 comprises a valve 101 in the form of a linear single seat valve, which imparts a linear movement to the valve disc 9. The valve arrangement 100 shown in FIG. 1 also comprises a valve controller 102 for controlling the operation of the valve 101. The valve controller 102 is implemented as a separate component attached onto an upper portion of the valve 101. The valve 101 comprises a valve housing 3 that defines an internal fluid channel 4 which extends between an inlet opening 5 and an outlet opening 6. The valve 101 comprises a flow controlling element 7, which is formed as an elongated valve steam 8 that extends into the fluid channel 4 and has a valve disc 9 at its lower portion. The valve stem 8 and the valve disc 9 are movable in unison on a linear path so as to move the valve disc 9 in relation to a valve seat 10, which is defined in the fluid channel 4. When the valve disc 9 is brought into engagement with the valve seat 10, the valve 101 is closed. When the valve disc 9 is moved away from the valve seat 10, the valve 101 is opened such that a fluid may flow from the inlet opening 5 via the valve seat 10 to the outlet opening 6. The valve 101 of the valve arrangement shown in FIG. 1 thus has two predefined states: a closed state and an open state. The valve 101 further comprises an actuator 11, which is mechanically coupled to the flow controlling element 7 and is operable to move the flow controlling element 7 in relation to the valve seat 10. In the illustrated example, the actuator 11 is a fluid-operated actuator. Thus, the actuator 11 is selectively pressurized by a pressurized fluid (pneumatic or hydraulic), typically pressurized air, which is conveyed to and from the actuator 11 through a pressure conduit 12. The valve controller 102 has a pilot valve 25 coupled to the actuator 11 by the pressure conduit 12. The pilot valve 25 controls a flow of the pressurized fluid in the form of pressurized air and allows the pressurized fluid to enter and energize the actuator 11 via the pressure conduit 12. The pilot valve 25 also allows the pressurized fluid to de-energizing the actuator by allowing the pressurized fluid to leave the actuator 11 via the pressure conduit 12.

Specifically, the linear single seat valve 101 of FIG. 1 is formed as a combination of an actuator 11, a connection element 30 and a valve housing 3. The valve controller 102 is attached to the actuator 11 at the top of the valve 101. The valve housing 3 defines a fluid channel 4 that extends between inlet and outlet openings 5, 6. A valve stem 8 with a valve disc 9 is movable in a direction towards and from a valve seat 10 along a direction parallel to a geometrical center axis A of the valve stem 8. The actuator 11 comprises a cylindrical actuator housing 31. An actuator rod 32 extends through openings in the top and bottom portions of the actuator housing 31. The top portion of the actuator rod 32 includes a magnet 27 that interacts with the position sensor 26 in the valve controller 102, and the lower portion of the actuator rod 32 is connected to the upper portion of the valve stem 8. The actuator rod 32 is movable back and forth in a direction parallel to the geometrical center axis A of the valve stem 8. The connection element 30 defines a cylindrical, hollow body that mechanically connects the valve housing 3 to the actuator housing 31. Inside the actuator housing 31, a pre-compressed spring 33 is arranged with one spring end acting on the actuator housing 31 and the opposite spring end acting on a piston 34 which is attached to the actuator rod 32. The force exerted by the spring 33 thereby acts to move the piston 34 to a lowermost position, in which the valve disc 9 abuts the valve seat 10 and thus the valve 101 is normally closed. A control fluid opening 13 is defined in the actuator housing 31. The control fluid (typically air) is supplied by an external source of pressurized fluid, which is connected to the valve controller by a pressure tube, along a pressure conduit 12 that extends from the valve controller 102 to the control fluid opening 13. The valve controller 102 is operable to selectively open and close the pressure conduit 12 by a control valve 25. When the valve controller 102 opens the pressure conduit 12, the control fluid enters a pressure chamber 51 of the actuator housing 31 and exerts a force on the piston 34 sufficient to overcome the force exerted by the spring 33, thereby opening the valve 101 by driving the piston 34, and hence also the valve disc 9, in an upward direction. When the valve controller 102 closes the pressure conduit 12, and concurrently expels control fluid from the actuator housing 31 through a vent opening (not shown) on the valve controller 102, the force exerted by the spring 33 eventually overcomes the force exerted by the control fluid on the piston 34, which closes the valve 101.

Figure 2:
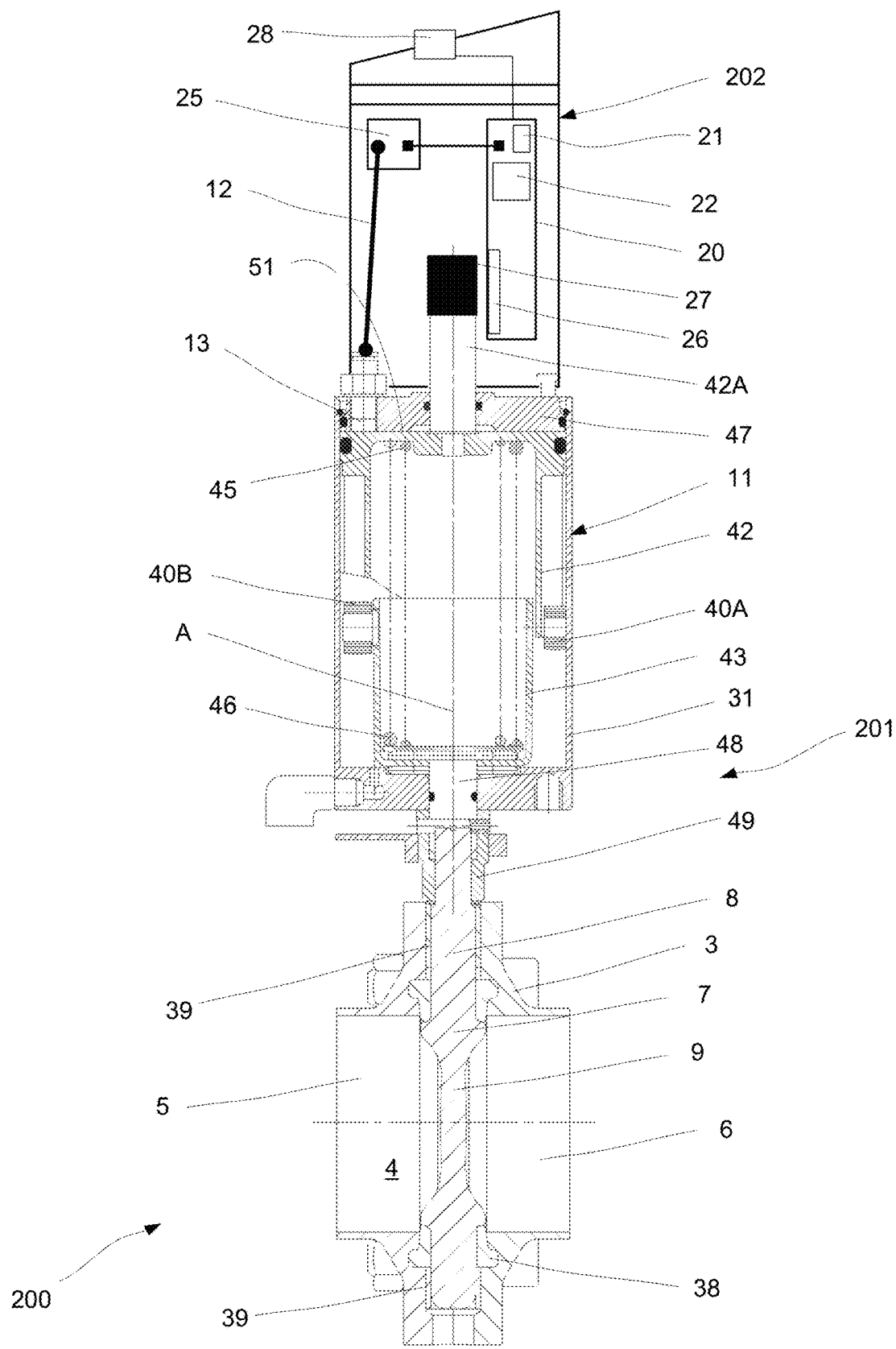
FIG. 2 is a cross sectional view of a valve arrangement that includes a valve controller and a rotatable valve having two states.
Figures 3A, 3B, 3C:
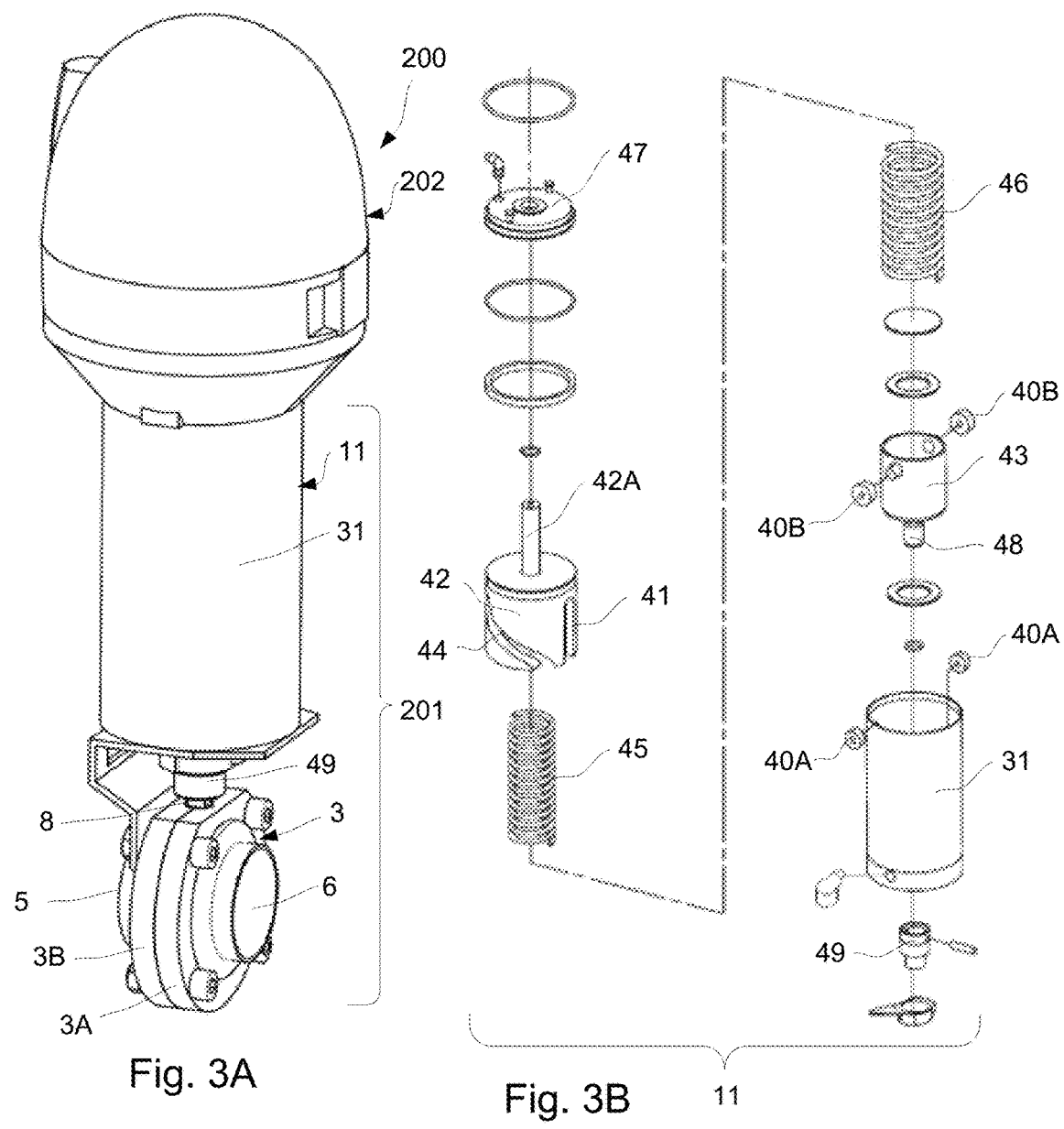
FIG. 3A is a perspective view of a similar valve arrangement as shown in FIG. 2.
FIG. 3B is an exploded perspective view of an actuator included in the valve arrangement of FIG. 3A.
FIG. 3C is an exploded perspective view of a valve housing included in the valve arrangement of FIG. 3A.

The valve arrangement 200 shown in FIG. 2 comprises a valve 201 in the form of a rotatable single seat valve, which imparts a rotating movement to the valve disc 9, more particularly in the form of a butterfly valve. FIGS. 3A-C show a similar valve arrangement 200 including a butterfly valve. FIGS. 3A-C illustrate the same valve 201 as shown in FIG. 2. The valve arrangement 200 shown in FIGS. 2 and 3A-C also comprises a valve controller 202 for controlling the operation of the valve 201. The valve controller 202 is implemented as a separate component attached onto an upper portion of the valve 201. The valve 201 comprises a valve housing 3 that defines an internal fluid channel 4 which extends between an inlet opening 5 and an outlet opening 6. The valve 201 comprises a flow controlling element 7, which is formed as an elongated valve steam 8 that has a valve disc 9 arranged in the fluid channel 4. The valve stem 8 and the valve disc 9 are rotatable in unison so as to move the valve disc 9 in relation to a valve seat 10, which is defined in the fluid channel 4. When the valve disc 9 is brought into engagement with the valve seat 10, the valve 201 is closed. When the valve disc 9 is moved away from the valve seat 10, the valve 201 is opened such that a fluid may flow from the inlet opening 5 via the valve seat 10 to the outlet opening 6. The valve 201 of the valve arrangement shown in FIGS. 2 and 3A-C thus has two predefined states: a closed state and an open state. The valve 201 further comprises an actuator 11, which is mechanically coupled to the flow controlling element 7 and is operable to rotate the flow controlling element 7 in relation to the valve seat 10. In the illustrated example, the actuator 11 is a fluid-operated actuator. Thus, the actuator 11 is selectively pressurized by a pressurized fluid (pneumatic or hydraulic), typically pressurized air, which is conveyed to and from the actuator 11 through a pressure conduit 12. The valve controller 202 has a pilot valve 25 coupled to the actuator 11 by the pressure conduit 12. The pilot valve 25 controls a flow of the pressurized fluid in the form of pressurized air and allows the pressurized fluid to enter and energize the actuator 11 via the pressure conduit 12. The pilot valve 25 also allows the pressurized fluid to de-energizing the actuator by allowing the pressurized fluid to leave the actuator 11 via the pressure conduit 12.

Specifically, the butterfly valve 201 of FIGS. 2 and 3A-C is formed as a combination of an actuator 11 and a valve housing 3. The valve controller 202 is attached to actuator 11 at the top of the butterfly valve 201. As seen in FIG. 3C, the valve housing 3 is formed by two valve body halves 3A, 3B which are combined by screws. The valve housing 3 defines a fluid channel 4 that extends between an inlet opening 5 and an outlet opening 6. A seal ring 38 is fitted between the valve body halves 3A, 3B and receives a disc 9 of a flow controlling element 7 which is arranged for rotation by its valve stem 8 being located in bushings 39 attached to the valve housing 3. The flow controlling element 7 is rotatable between a closed position, in which the disc 9 is rotated with its normal direction parallel to the fluid channel, and an open position, in which the disc 9 is rotated with its normal direction perpendicular to the fluid channel. In the closed position, the disc 9 engages the valve seat 10. In the open position, the disc 9 is disengaged from the valve seat 10. The structure of the actuator 11 is depicted in FIGS. 2 and 3B.

The actuator 11 comprises an actuator housing 31, also denoted air cylinder. Needle bearings 40A are attached inside the actuator housing 31 to cooperate with an axial guiding groove 41 on a piston 42, which is arranged for axial movement inside the actuator housing 31. A rotating cylinder 43 is arranged within the piston 42 and has needle bearings 40B on its outside for cooperation with slanted guiding grooves 44 on the piston 42. An inner spring 45 and an outer spring 46 are encased between and within the piston 42 and the rotating cylinder 43. An end cap 47 is attached to the actuator housing 31 to close the actuator 11. A control fluid opening 13 is defined in the end cap 47 to admit a control fluid. The rotating cylinder 43 has an axial shaft 48, which projects through the bottom of the actuator housing 31. A coupling 49 is attached to the shaft 48 for connection to the upper portion of the valve stem 8. The piston 42 has an axial stem portion 42A, which projects through the end cap 47. Although not shown, a magnet is arranged on the stem portion 42A for interaction with the position sensor in the valve controller 202. As seen in FIG. 2B, the actuator 11 comprises a number of other components, such as o-rings, retaining rings, thrust bearings, a thrust plate etc, which are not described in further detail. Based on the foregoing, it is sufficient that the skilled person understands that the actuator 11 is designed so that an axial movement of the piston 42 is transformed into a 90° rotation of the shaft 48 and thus of the flow controlling element 7 within the valve housing 3. The axial movement is controlled by selectively controlling the flow of control fluid to and from the actuator housing 31 via the control fluid opening 13, in analogy with the control described in connection with FIG. 1. When the valve controller 202 opens the pressure conduit 12, the control fluid enters a pressure chamber 51 of the actuator housing 31 and exerts a force on the piston 42 sufficient to overcome the force exerted by the springs 45, 46, thereby opening the valve 201 by driving the piston 42 in a downward direction and hence rotating the rotating cylinder 43 and the valve disc 9. When the valve controller 202 closes the pressure conduit 12, and concurrently expels control fluid from the actuator housing 31 through a vent opening (not shown) on the valve controller 202, the force exerted by the springs 45, 46 eventually overcomes the force exerted by the control fluid on the piston 42, which closes the valve 201.

Figure 4:
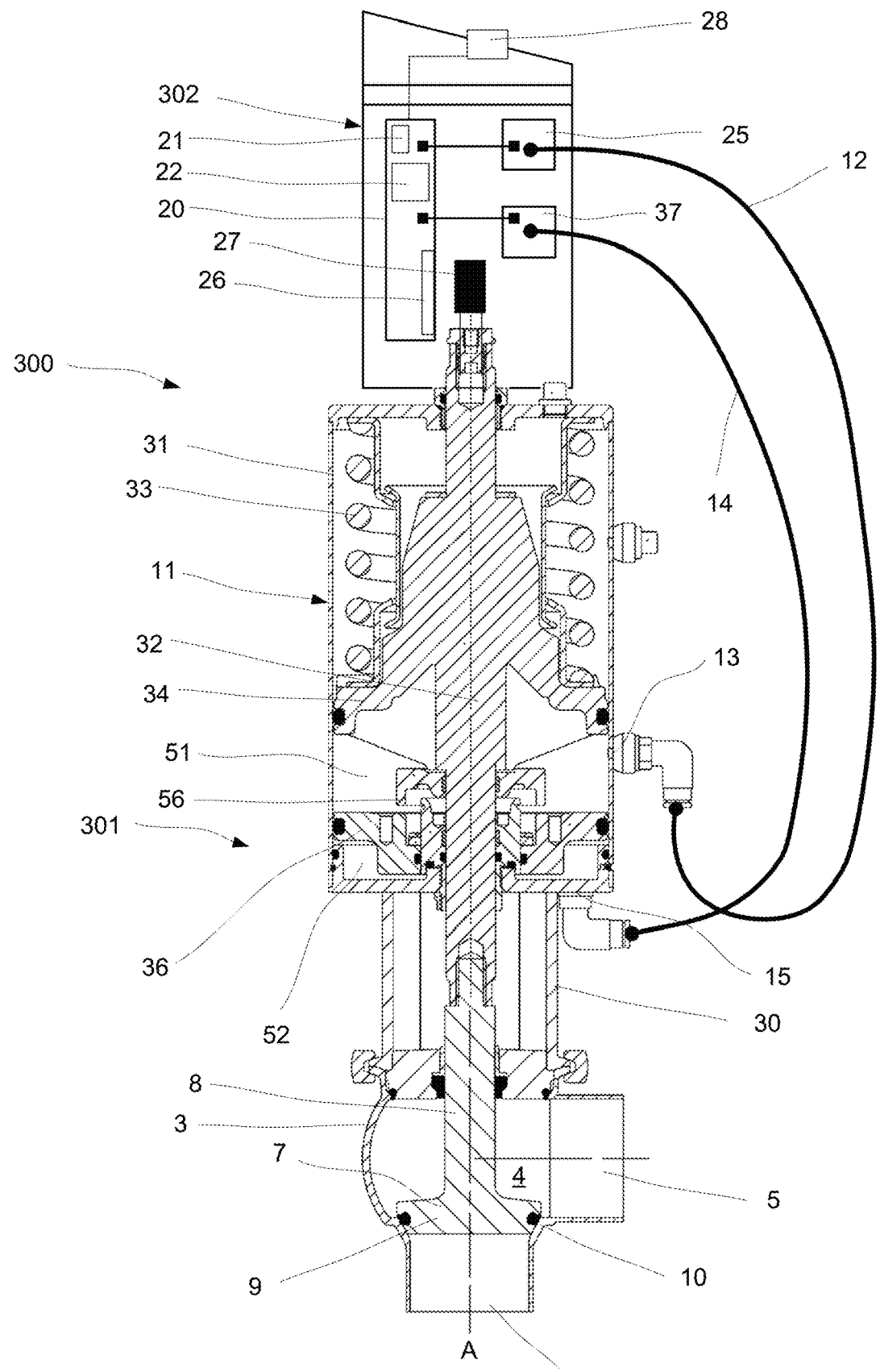
FIG. 4 is a cross sectional view of a valve arrangement that includes a valve controller and a linear single seat valve having three states.

The valve arrangement 300 shown in FIG. 4 comprises a valve 301 in the form of a linear single seat valve, which imparts a linear movement to the valve disc 9. The valve assembly 300 of FIG. 4 is essentially identical to the valve assembly of FIG. 1, i.e. the valve 301 of FIG. 4 is essentially identical to the valve 101 of FIG. 1 and the valve controller 302 of FIG. 4 is essentially identical to the valve controller 102 of FIG. 1, except for the following differences. The piston 34 is a first piston and the control fluid opening 13 is a first control fluid opening 13 connected to a first pressure chamber 51 of the actuator 11. When control fluid enters the first pressure chamber 51, the control fluid exerts a force on the first piston 34 sufficient to overcome the force exerted by the spring 33 such that the first piston 34 and hence also the valve disc 9 is moved upwards and the valve 301 is opened. Further, the pressure conduit 12 is a first pressure conduit 12 and the pilot valve 25 is a first pilot valve connected to the first control fluid opening 13 by the first pressure conduit 12. In addition, the valve 301 comprises a second piston 36 slidably arranged in the actuator. The second piston 36 is slidably connected to the actuator rod 32 such that the second piston 36 engages the actuator rod 32 when lifted upwards, thereby lifting the actuator rod 32 and hence the valve stem 8. The valve 301 also comprises a second control fluid opening 15 connected to a second pressure chamber 52 of the actuator. When control fluid enters the second pressure chamber 52, the control fluid exerts a force on the second piston 36 sufficient to overcome the force exerted by the spring 33 such that the second piston 36 and hence also the valve disc 9 is moved upwards until the second piston 36 abuts a (first) stop 56. The (first) stop 56 is arranged such that the movement of the valve stem 8 is smaller when lifted by the second piston 36 than when lifted by the first piston 34. The lifting of the valve stem 8 by the second piston 36 results in a gap between the valve disc 9 and the valve seat 10, which is smaller than the gap between the valve disc 9 and the valve seat 10 in the open position. This is usually denoted a seat-lift state. The valve 301 of the valve arrangement shown in FIG. 4 thus has three predefined states: a closed state, an open state and a seat-lift state. The valve controller 302 has a second pilot valve 37 coupled to the actuator 11 by a second pressure conduit 14. The second pilot valve 37 controls a flow of the pressurized fluid in the form of pressurized air and allows the pressurized fluid to enter and energize the actuator 11 via the second pressure conduit 14. The second pilot valve 37 also allows the pressurized fluid to de-energizing the actuator by allowing the pressurized fluid to leave the actuator 11 via the second pressure conduit 14. The second control fluid opening 15 is defined in the actuator housing 31. The control fluid is supplied by an external source of pressurized fluid, which is connected to the valve controller by a pressure tube, along the second pressure conduit 14 that extends from the valve controller 302 to the second control fluid opening 15. The valve controller 302 is operable to selectively open and close the second pressure conduit 14 by the second control valve 37 in order to control the seat-lift position. When the valve controller 302 opens the second pressure conduit 14, the control fluid enters a second pressure chamber 52 of the actuator housing 31 and exerts a force on the second piston 36 sufficient to overcome the force exerted by the spring 33, thereby partly opening the valve 301 by driving the second piston 36, and hence also the valve disc 9, in an upward direction to the seat-lift position. When the valve controller 302 closes the second pressure conduit 14, and concurrently expels control fluid from the second chamber 52 of the actuator housing 31 through a vent opening (not shown) on the valve controller 302, the force exerted by the spring 33 eventually overcomes the force exerted by the control fluid on the second piston 36, which closes the valve 301. The valve 301 is a linear single seat valve with seat-lift function.

Figure 5:
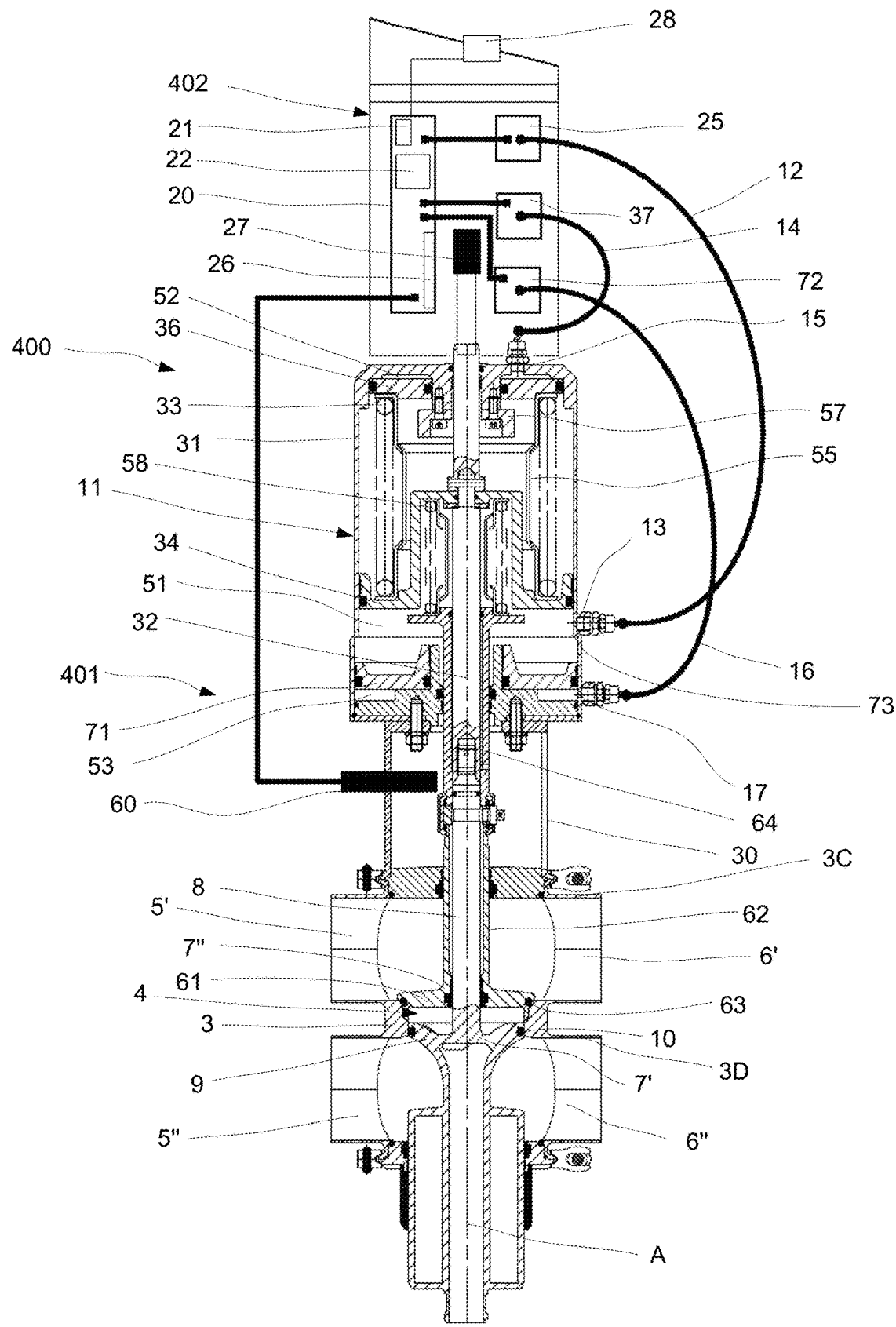
FIG. 5 is a cross sectional view of a valve arrangement that includes a valve controller and a linear double seat valve having four states.

The valve arrangement 400 shown in FIG. 5 comprises a valve 401 in the form of a linear double seat valve, which imparts a linear movement to a first valve disc 9 and a second valve disc 61. The valve arrangement 400 shown in FIG. 5 also comprises a valve controller 402 for controlling the operation of the valve 401. The valve controller 402 is implemented as a separate component attached onto an upper portion of the valve 401. The valve 401 comprises a valve housing 3 that defines an internal fluid channel 4 which extends between a first inlet opening 5' and a second inlet opening 5" of a first valve housing portion 3C and a first outlet opening 6' and a second outlet opening 6" of a second valve housing portion 3D. More precisely, the internal fluid channel 4 extends between on one hand a first inlet opening 5' and a second inlet opening 5" of a first valve housing portion 3C and one another hand a first outlet opening 6' and a second outlet opening 6" of a second valve housing portion 3D. Thus, the internal fluid channel 4 extends between the first valve housing portion 3C and the second valve housing portion 3D. The internal fluid channel connects the first inlet opening 5' and the first outlet opening 6' with the second inlet opening 5" and the second outlet opening 6". The valve 401 comprises a first flow controlling element 7', which is formed as an elongated first valve stem 8 that extends into the fluid channel 4 and has a first valve disc 9 at its lower portion. The first valve stem 8 and the first valve disc 9 are movable in unison on a linear path so as to move the first valve disc 9 in relation to a first valve seat 10, which is defined in the fluid channel 4. The valve 401 also comprises a second flow controlling element 7", which is formed as a hollow elongated second valve steam 62 that is arranged around the first valve stem 8 and that extends into the fluid channel 4 and has the second valve disc 61 at its lower portion. The second valve stem 62 and the second valve disc 61 are movable in unison on a linear path so as to move the second valve disc 61 in relation to a second valve seat 63, which is defined in the fluid channel 4. When the first valve disc 9 is brought into engagement with the first valve seat 10 and the second valve disc 61 is brought into engagement with the second valve seat 63, the valve 401 is closed. This is usually denoted a closed state. When the first valve disc 9 is moved away from the first valve seat 10 and the second valve disc 61 is moved away from the second valve seat 63, the valve 401 is opened such that a fluid may flow from the first inlet opening 5' to the second outlet opening 6" and/or from the second inlet opening 5" to the first outlet opening 6'. Typically, when the valve is closed a first fluid is conveyed in the first valve body portion 3C from the first inlet opening 5' to the first outlet opening 6' and a second fluid is conveyed in the second valve body portion 3D form the second inlet opening 5" to the second outlet opening 6". When the valve is open, the first fluid may be conveyed through the fluid channel 4 to the second outlet opening 6" or the second fluid may be conveyed through the fluid channel 4 to the first outlet opening 6'. This is usually denoted an open state. The valve 401 further comprises an actuator 11, which is mechanically coupled to the first flow controlling element 7' and the second flow controlling element 7". The actuator 11 is operable to move the first flow controlling element 7' in relation to the first valve seat 10 and is operable to move the second flow controlling element 7" in relation to the second valve seat 63. In the illustrated example, the actuator 11 is a fluid-operated actuator. Thus, the actuator 11 is selectively pressurized by a pressurized fluid (pneumatic or hydraulic), typically pressurized air, which is conveyed to and from the actuator 11 through a first pressure conduit 12, a second pressure conduit 14 and a third pressure conduit 16. The valve controller 402 has a first pilot valve 25 coupled to the actuator 11 by the first pressure conduit 12. The first pilot valve 25 controls a flow of the pressurized fluid in the form of pressurized air and allows the pressurized fluid to enter and energize the actuator 11 via the first pressure conduit 12. The first pilot valve 25 also allows the pressurized fluid to de-energizing the actuator by allowing the pressurized fluid to leave the actuator 11 via the first pressure conduit 12. The valve controller 402 has a second pilot valve 37 coupled to the actuator 11 by the second pressure conduit 14. The second pilot valve 37 controls a flow of the pressurized fluid in the form of pressurized air and allows the pressurized fluid to enter and energize the actuator 11 via the second pressure conduit 14. The second pilot valve 37 also allows the pressurized fluid to de-energizing the actuator by allowing the pressurized fluid to leave the actuator 11 via the second pressure conduit 14. The valve controller 402 has a third pilot valve 72 coupled to the actuator 11 by the third pressure conduit 16. The third pilot valve 72 controls a flow of the pressurized fluid in the form of pressurized air and allows the pressurized fluid to enter and energize the actuator 11 via the third pressure conduit 16. The third pilot valve 72 also allows the pressurized fluid to de-energizing the actuator by allowing the pressurized fluid to leave the actuator 11 via the third pressure conduit 16.

Specifically, the linear double seat valve 401 of FIG. 5 is formed as a combination of an actuator 11, a connection element 30 and a valve housing 3. The valve controller 402 is attached to the actuator 11 at the top of the valve 401. The valve housing 3 defines a fluid channel 4 that extends between a first valve housing portion 3C having a first inlet opening 5' and a first outlet opening 6' and a second valve housing portion 3D having a second inlet opening 5" and a second outlet opening 6". A first valve stem 8 with a first valve disc 9 is movable in a direction towards and from a first valve seat 10 along a direction parallel to a geometrical center axis A of the first valve stem 8. A hollow second valve stem 62 with a second valve disc 61 is movable in a direction towards and from a second valve seat 63 along a direction parallel to the geometrical center axis A of the first valve stem 8. The actuator 11 comprises a cylindrical actuator housing 31. A first actuator rod 32 extends through openings in the top and bottom portions of the actuator housing 31. A second actuator rod 64 extends through the opening in the bottom portion of the actuator housing 31. The top portion of the first actuator rod 32 includes a magnet 27 that interacts with the position sensor 26 in the valve controller 402, and the lower portion of the first actuator rod 32 is connected to the upper portion of the first valve stem 8. The lower portion of the second actuator rod 64 is connected to the upper portion of the second valve stem 62. The first actuator rod 32 and the second actuator rod 64 are movable back and forth in a direction parallel to the geometrical center axis A of the first valve stem 8. The connection element 30 defines a cylindrical, hollow body that mechanically connects the valve housing 3 to the actuator housing 31. Inside the actuator housing 31, a pre-compressed first spring 33 is arranged with one spring end acting on a second piston 36, which at rest abuts the actuator housing 31, and the opposite spring end acting on a first piston 34 which is attached to the first actuator rod 32. The first piston 34 as well as the second piston 36 is slidingly arranged in the actuator housing 31. The force exerted by the first spring 33 thereby acts to move the first piston 34 downwards until a stop mechanism 55, which is devised of three cylinders slidingly movable in relation to each other to a maximum extension defined by interacting bent end portions of the cylinders, stops further downward movement. In this position, the first valve disc 9 abuts the valve seat 10. The actuator 11 also comprises a second spring 58 with one end acting on the first piston 34 and the opposite spring end acting on the second actuator rod 64. The force exerted by the second spring 58 (in combination with the force exerted by the first spring 33) thereby acts to move the second actuator rod 58 and thus the second valve disc 61 downwards until the second valve disc 61 abuts the second valve seat 63. Thus the valve 401 is normally closed.

A first control fluid opening 13 is defined in the actuator housing 31. The control fluid (typically air) is supplied by an external source of pressurized fluid, which is connected to the valve controller by a pressure tube, along a first pressure conduit 12 that extends from the valve controller 402 to the first control fluid opening 13. The valve controller 402 is operable to selectively open and close the first pressure conduit 12 by a first control valve 25. When the valve controller 402 opens the first pressure conduit 12, the control fluid enters a first pressure chamber 51 of the actuator housing 31 and exerts a force on the first piston 34 sufficient to overcome the force exerted by the first spring 33, thereby driving the first piston 34, and hence also the first valve disc 9, in an upward direction. When the first valve disc 9 is moved upwards it will abut the second valve disc 61 which thereby also is brought upwards. Thereby, the first valve disc 9 is disengaged from the first valve seat 10 and the second valve disc 61 is disengaged from the second valve seat 63 and thus, the valve 401 is in an open state. When the valve controller 402 closes the first pressure conduit 12, and concurrently expels control fluid from the first pressure chamber 51 of the actuator housing 31 through a vent opening (not shown) on the valve controller 402, the force exerted by the first spring 33 eventually overcomes the force exerted by the control fluid on the first piston 34, which closes the valve 101.

A second control fluid opening 15 is defined in the actuator housing 31. The control fluid is supplied by an external source of pressurized fluid, which is connected to the valve controller by a pressure tube, along a second pressure conduit 14 that extends from the valve controller 402 to the second control fluid opening 15. The valve controller 402 is operable to selectively open and close the second pressure conduit 14 by a second control valve 37. When the valve controller 402 opens the second pressure conduit 14, the control fluid enters a second pressure chamber 52 of the actuator housing 31 and exerts a force on the second piston 36 sufficient to overcome the force exerted by the second spring 58, thereby driving the second piston 36, the first spring 33 and the first piston 34 and hence also the first valve disc 9, in a downward direction until the first piston 34 abuts the second actuator rod 64. The control fluid entering the second pressure chamber 52 of the actuator housing 31 may exert a force on the second piston 36 that also is sufficient to overcome the force exerted by the first spring 33, thereby driving the second piston 36 and hence also the first valve disc 9, in a downward direction until the second piston 36 abuts a second stop 57. Thereby, the first valve disc 9 is disengaged from the first valve seat 10. Then, the first valve disc 9 is in a seat-lift position or rather a seat-push position and the valve 401 is in a seat-push state. When the valve controller 402 closes the second pressure conduit 14, and concurrently expels control fluid from the second pressure chamber 52 of the actuator housing 31 through a vent opening (not shown) on the valve controller 402, the force exerted by the second spring 58 and the first spring 33 eventually overcomes the force exerted by the control fluid on the second piston 36, which closes the valve 401.

The actuator 11 comprises a third piston 71 slidingly arranged in the actuator housing 31. A third control fluid opening 17 is defined in the actuator housing 31. The control fluid is supplied by an external source of pressurized fluid, which is connected to the valve controller by a pressure tube, along the third pressure conduit 16 that extends from the valve controller 402 to the third control fluid opening 17. The valve controller 402 is operable to selectively open and close the third pressure conduit 16 by a third control valve 72. When the valve controller 402 opens the third pressure conduit 16, the control fluid enters a third pressure chamber 53 of the actuator housing 31 and exerts a force on the third piston 71, thereby driving the third piston 71, which in turn engages the second actuator rod 64 (more precisely a protruding shoulder of the actuator rod 64). The exerted force is sufficient to overcome the force exerted by the second spring 58, and thereby the second actuator rod 64 and hence also the second valve disc 61, is moved in an upward direction until the third piston 71 abuts a third stop 73. Thereby, the second valve disc 61 is disengaged form the second valve seat 63 and thus, the second valve disc 61 is in seat-lift position and the valve 401 is in seat-lift state. When the valve controller 402 closes the third pressure conduit 16, and concurrently expels control fluid from the third pressure chamber 53 of the actuator housing 31 through a vent opening (not shown) on the valve controller 402, the force exerted by the second spring 58 eventually overcomes the force exerted by the control fluid on the third piston 71, which closes the valve 401. The valve 401 is a double seat valve with seat-lift and seat-push function. The valve 401 of the valve arrangement shown in FIG. 5 thus has four predefined states: a closed state, an open state, a seat-push state and a seat-lift state. The valve assembly 400 comprises an external sensor 60 connected to the valve controller 402 and detecting a position of the second actuator rod 64 and thus of the second valve disc 61. Similar valve arrangements having two flow controlling elements and three pilot valves but two seat-lift states involving one seat-lift position for each flow controlling element are known in the art and suitable for implementation of the invention.

The valve controller 102, 202, 302, 402 is configured to control, based on external control signals, the operation of the valve 101, 201, 301, 401 and contains all electronic components of the valve arrangement 100, 200, 300, 400. As noted above, the illustrated valve controller 102, 202, 302, 402 is a separate component which is attached to the valve 101, 201, 301, 401. The same valve controller 102, 202, 302, 402 may be attached to and operated to control different types of valves 101, 201, 301, 401 or specific valve controllers may be provided or equipped for specific valve types. The valves 101, 201, 301, 401 preferably have a common mechanical interface for attachment of the valve controller 102, 202, 302, 402. For example it may be desired to attach a valve controller 302 provided or equipped for a single seat valve with seat-lift function or a valve controller 402 provided or equipped for a double seat valve on a single seat valve 101, 201, since it is available on stock, since it reduces the necessary stock or since it may be desired to have the same type of valve controller attached to all valves of an installation. In other words, it may be desired to use the same hardware on different types of valves. Further, it may be desired to use the same software in different valve controllers, which is enabled by the present invention. In the following discussion it is assumed that the valve controller 102, 202, 302, 402 is configured for installation on different types of valves, such as linear single seat valves, rotatable single seat valves, linear single seat valves with seat-lift function and linear double seat valves with seat-lift function and seat-push function (or two seat-lift functions).

The valve controller 102, 202, 302, 402 comprises a control unit 20 connected to the position sensor 26 and the at least one pilot valve 25, 37, 72. The internal operation of the valve controller 102, 202, 302, 402 is controlled by the control unit 20. The control unit may comprise a data processor 21 and an electronic memory 22. The data processor 21 may be implemented as a microprocessor, a CPU ("Central Processing Unit"), a DSP ("Digital Signal Processor"), an ASIC ("Application-Specific Integrated Circuit"), discrete analog and/or digital components, or some other programmable logical device, such as an FPGA ("Field Programmable Gate Array"). The electronic memory 22 may include one or more computer storage media in the form of volatile and/or non-volatile memory such as read only memory (ROM), random access memory (RAM) and flash memory. Special-purpose software comprising machine-readable instructions for execution by the data processor 21 may be stored in the system memory, or on another removable/non-removable volatile/non-volatile computer storage medium which is included in or accessible to the valve controller 102, 202, 302, 402.

The valve controller 102, 202, 302, 402 comprises an input/output (I/O) interface (not shown) for connection to an external control system or control network (not shown). The control network may be of any type, including but not limited to control networks based on commercially available standards such as Modbus, DeviceNet, Profibus, Fieldbus and Actuator-Sensor Interface (AS-interface).

The valve controller 102, 202, 302, 402 comprises at least one pilot valve 25, 37, 72 that operates to selectively energize and de-energize the actuator 11, causing the actuator 11 to move the flow controlling element(s) 7 in the fluid channel 4. In the illustrated examples with a fluid-controlled actuator 11, the at least one pilot valve 25, 37, 72 may be implemented as an electromagnetic control valve which is installed in the control fluid line 12, 14, 16 to direct pneumatic or hydraulic pressure to the valve 101, 201, 301, 401, so as to energize the actuator 11, and from the valve 101, 201, 301, 401, so as to de-energize the actuator 11. The operation of the at least one pilot valve 25, 37, 72 is controlled by the control unit 20, in particular by the data processor 21. Furthermore, the at least one pilot valve 25, 37, 72 may instead be configured to electrically or electromagnetically energize and de-energize the actuator 11, as is well-known in the art. Depending on configuration, the valve 101, 201, 301, 401 may be either open or closed when the actuator 11 is totally de-energized, i.e. when no pressure fluid is supplied to the actuator 11 and only spring(s) act on the valve disc(s). A valve being closed when totally de-energized is normally denoted as a normally closed valve. For the purpose of the following disclosure, it is assumed that the valve 101, 201, 301, 401 is closed when the actuator 11 is totally de-energized.

The position sensor 26 is configured to generate a position signal that represents the current position of the flow controlling element 7 in a predefined coordinate system within a sensing range. In the illustrated examples, the position sensor 26 is a magnetoresistance sensor that senses the location of a magnet 27, which is attached on or integrated in an upper portion of the stem 8 or actuator rod 32 that moves in unison with the flow controlling element 7. The upper portion of the stem 8 or actuator rod 32 is thus directly or indirectly coupled to the flow controlling element 7, and its movement represents the movement of the flow controlling element 7 with respect to the valve seat 10. It should be understood that the position sensor 26 may be of any conventional type, including but not limited to an inductive sensor array, a laser based sensor, an ultrasound sensor, a mechanical switch array, etc. In the following discussion and as shown in FIGS. 1-5, it is assumed that the position sensor 26 measures a linear motion of the upper portion of the stem 8, the actuator rod 32 or the axial stem portion 42A and indicates a first position when the valve 101, 201, 301, 401 is closed, and a second position when the valve 101, 201, 301, 401 is open. It is also assumed that the same configuration of the position sensor 26 and the sensing range is valid for all valves that are controlled by the valve controller 102, 201, 301, 401, including both linear seat valves and rotatable valves. Thus, the butterfly valves also have the axel stem portion 42A provided with a magnet 27 that projects into the valve controller 102, 202, 302, 401 and moves on a linear path to represent the movement of the flow controlling element 7. This means that the actuator 11 of the rotatable valve is configured to convert the rotational movement of the flow controlling element 7 into a linear movement of the axial stem portion 42A.

The valve controller 102, 202, 302, 402 further comprises a status indicator 28, which may be one or more LEDs, a display, an audio signaling device (e.g. a speaker, buzzer, beeper), etc. The status indicator 28 is configured to indicate operational errors and other errors of the valve arrangement 100, 200, 300, 400 to an external observer, and may also indicate that the valve arrangement 100, 200, 300, 400 operates properly (absence of errors). The status indicator 28 may further be configured to indicate the state of the valve. The operation of the status indicator 28 is controlled by the control unit 20, in particular by the data processor 21.

Figure 9:
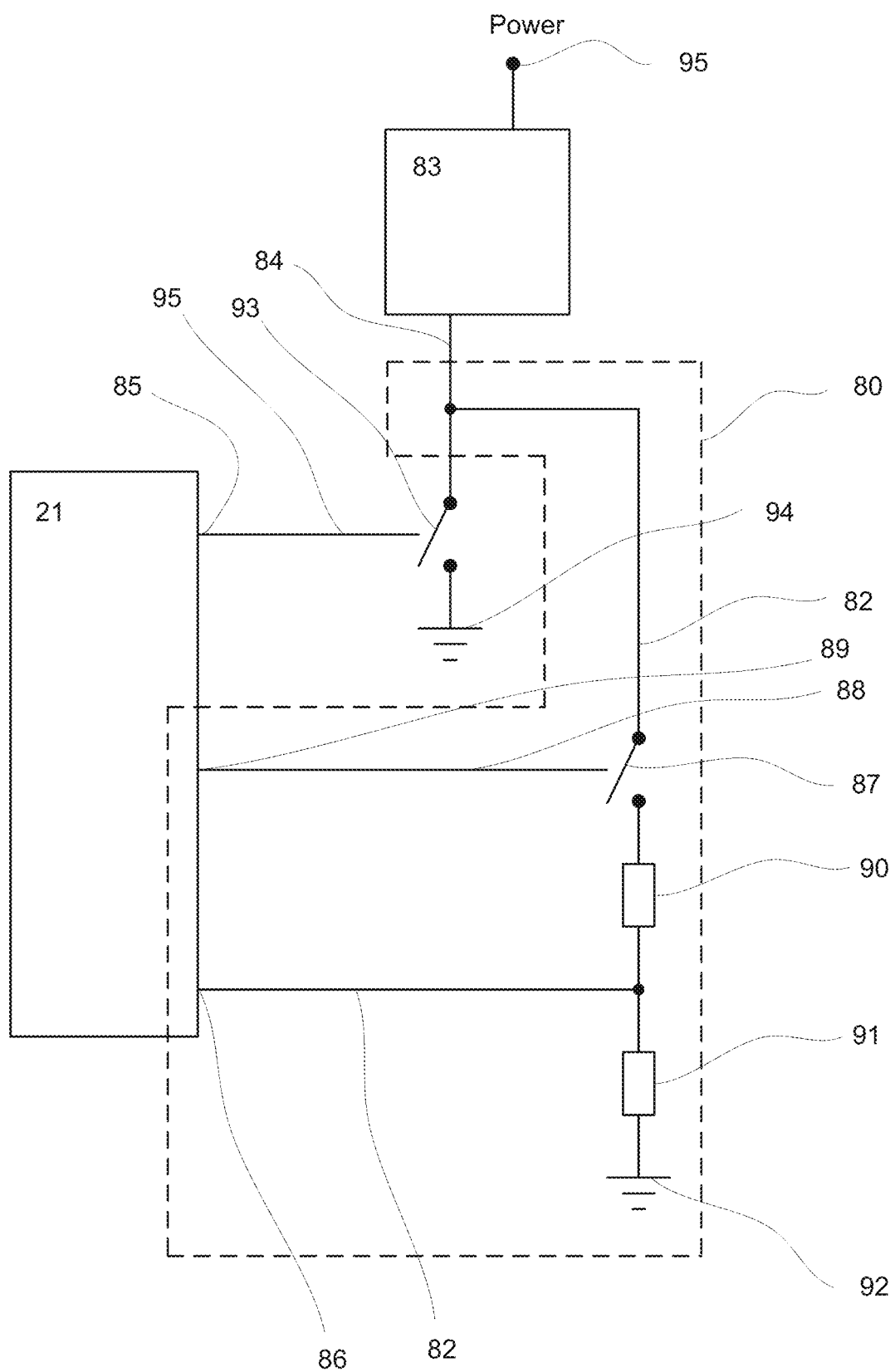
FIG. 9 is a principal sketch of a pilot valve detection circuitry of a valve controller.

With reference to FIG. 9, the valve controller 102, 202, 302, 402 comprises at least one pilot valve detection circuitry 80 to establish the pilot valve integer. The valve controller 102, 202, 302, 402 comprises a pilot valve detection circuitry 80 for each potential pilot valve 25, 37, 72. The pilot valve detection circuitry 80 is connected to the pilot valve, more precisely to a control connection 84 connected to the pilot valve 83. The pilot valve detection circuitry 80 is connected to the control unit 20, in particular the pilot valve detection circuitry 80 is connected to the processor 21 of the control unit 20. The pilot valve detection circuitry 80 gives a feedback to the processor 21. The pilot valve detection circuitry 80 comprises a feedback connection 82 connected to the pilot valve 83, or to a control connection 84 connected to the pilot valve 83. The feedback connection 82 is also connected to an input terminal 86 of the processor 21. The feedback connection 82 may comprise a feedback switch 87, which is operated by a switch connection 88 connected to the feedback switch 87 and a switch output terminal 89 of the processor 21. The feedback connection 82 may comprise a first resistor 90 connected between the feedback switch 87 and the input terminal 86. The pilot valve detection circuitry 80 may also comprise a second resistor 91 connected to the feedback connection 82 in a point between the first resistor 90 and the input terminal 86. The second resistor 91 is also connected to ground 92. The pilot valve 83 is connected to a power source 95. The pilot valve 83 is connected to the control connection 84, which comprises a valve switch 93 connected to ground 94. The valve switch 93 is operated by an operating connection 95 connected to a control output terminal 85 of the processor 21. The pilot valve 83 is controlled, e.g. changed from closed to opened or vice versa, by sending a status change signal on the control output terminal 85, which closes the valve switch 93, such that there is a closed connection between the pilot valve 83 and ground 94. The pilot valve, which also is connected to the power source 95 is thus controlled such that its status is changed e.g. from closed to opened or vice versa.

The presence of a pilot valve is determined by closing the feedback switch 87, which is initiated by a signal on the switch output terminal 89. When the feedback switch 87 is closed and a pilot valve 83 is present and enabled, the feedback connection 82 from the pilot valve 83 to the input terminal 86 is closed and thus a signal is detected by the input terminal 86. Thereby, the presence of an enabled pilot valve 83 is concluded. The pilot valve detection circuitry 80 recognizes the number of enabled pilot valves. The pilot valve 83 may be any of the previously mentioned pilot valves 25, 37, 72. Since there potentially may be a plurality of pilot valves, each having a pilot valve detection circuitry, the number of present and enabled pilot valves is summed up to establish the pilot valve integer. It is realized that the pilot valve detection circuitry can be designed in different ways and the components therein arranged in different ways. For example, the feedback switch 87 may be arranged between the second resistor 91 and the ground connection 92. Usually, the pilot valve 83 is enabled when connected to the control connection 84 and thus connected (indirectly) to ground 94, such that the connection from the power source 95, through the pilot valve 83 and to ground 94 can be closed when the valve switch 93 is closed. A pilot valve 83 is usually disabled when the control connection 84 is disconnected from the pilot valve 83.

The valve controller is configured to execute a configuration phase. The configuration phase comprises establishing a pilot valve integer corresponding to number of pilot valves 25, 37, 72. The configuration phase also comprises determining a tolerance criterion $\Delta P1$, $\Delta P2$ for the position signal POS based on the pilot valve integer. Thereby, the pilot valve integer and thus the number of pilot valves governs the tolerance criterion. The pilot valve integer may correspond to a number of said at least one pilot valve.

The configuration phase comprises controlling the position of the flow controlling element(s) 7 by means of said at least one pilot valve 25, 37, 72 to set the flow controlling element(s) 7 in a plurality of predefined states. The configuration phase also comprises acquiring, from the position signal POS, while the flow controlling element(s) 7 is in at least two of the predefined states, a nominal position value P1, P2, P3, P4 for each of said at least two of the predefined states.

The nominal position value is the position value determined by the position sensor when the flow controlling element(s) is in the predefined states during the configuration phase.

Preferably, the at least two of the predefined states include the closed state and the open state. Thereby, the nominal position value P1 for the closed state and the nominal position value P2 for the open state are obtained. Thus, also the plurality of predefined states includes the closed state and the open state. During the configuration phase, the flow controlling element is put in the closed position and the corresponding nominal position value P1 is obtained. The flow controlling element is also maneuvered into the open state and the corresponding nominal position P2 value is obtained. The configuration phase preferably comprises controlling the position of the flow controlling element(s) 7 by means of said at least one pilot valve 25, 37, 72 to set the flow controlling element(s) 7 in at least a first predefined state (e.g. a closed state) and a second predefined state (e.g. an open state). The configuration phase then also comprises acquiring, from the position signal POS, while the flow controlling element(s) 7 is in said at least a first predefined state and a second predefined state, a nominal position value P1, P2, P3, P4 for each of said at least a first predefined state and a second predefined state.

When possible, the at least two of the predefined states also include the seat-lift state and/or the seat-push state, i.e. if the pilot valve integer is larger than one. Thereby, the nominal position value for the seat-lift state and/or the nominal position value for the seat-push state are obtained. Thus, then the plurality of predefined states also includes the seat-lift state and/or the seat-push state. During the configuration phase, the flow controlling element 7/7' is then put in the seat-lift or seat-push position and the corresponding nominal position value is obtained. In case the pilot valve integer is three and if an external sensor 60 is present, additionally, the second flow controlling element 7" may be maneuvered into the seat-lift position and the corresponding nominal position value is obtained.

The pilot valve integer may be established in an initial phase of the configuration phase. If the valve integer is only one, the valve only has to be put in two predefined states during the configuration phase, i.e. a closed state and an open state, and thus the flow controlling element 7 only has to be positioned in the closed state and the open state. The nominal position value P1 for the closed state and the nominal position value P2 for the open state are obtained. If the valve integer is larger than one, the valve also should be put in at least one further state. If the valve integer is two, the valve should be put in a seat-lift state, i.e. the flow controlling element 7 should be maneuvered to a seat-lift position, and the corresponding nominal position value P3 obtained. If the valve integer is three, the valve should be put in a seat-push state, the first flow controlling element 7' maneuvered into a seat-push position and the corresponding nominal position value p3 obtained. If the valve integer is three, the valve may also be put in a seat-lift state, the second flow controlling element 7" maneuvered to a seat-lift position and a corresponding nominal position value P4 for the second flow controlling element 7" obtained by the external position sensor 60.

Referring to the statement above that the valve controller 102, 202, 302, 402 is configured to execute the configuration phase, more precisely the control unit 20 of the valve controller 102, 202, 302, 402 may be configured to execute the configuration process. In particular, the data processor 21 of the control unit 20 may be configured to execute the configuration process.

The tolerance criterion ΔP1, ΔP2 defines an acceptable range of position values for the flow controlling element(s) 7, as given by the position signal POS, while the flow controlling element(s) 7 is in one of the predefined states. The tolerance criterion defines the position values that are acceptable to consider the flow controlling element(s) and thus the valve to be in one of the predefined states, i.e. open state, closed state and possibly seat-push state and/or seat-lift state. If the position value for the flow controlling element is within the range of acceptable position values, the valve is considered to be in the desired predefined state. If the position value for the flow controlling element is outside the range of acceptable position values, the valve may be malfunctioning. The acceptable position values are different for the different predefined states.

The acceptable range of position values has a predefined relation to one of the nominal position values P1, P2, P3, P4. The valve controller is configured to set the acceptable range of position values in the predefined relation to said one of the nominal position values P1, P2, P3, P4. More precisely, the control unit 20 of the valve controller 102, 202, 302, 402 may be configured to set the acceptable range of position values in the predefined relation to said one of the nominal position values P1, P2, P3, P4. In particular, the data processor 21 of the control unit 20 may be configured to set the acceptable range of position values in the predefined relation to said one of the nominal position values P1, P2, P3, P4.

The tolerance criterion gives an acceptable deviation (x, y, z) for the position value in relation to the nominal position value. When the position value is within the acceptable range of position values, i.e. when the deviation of the position value is smaller than the acceptable deviation, the valve is considered to be in the desired predefined state. When the position value is outside the acceptable range of position values for the desired predefined state, i.e. when the deviation of the position value is larger than the acceptable deviation, the valve is potentially malfunctioning. The acceptable range of position values, and thus the acceptable deviation, may be symmetrical in relation to the nominal position value or asymmetrical in relation to the nominal position value. Thus, the maximum acceptable position value may have a larger or smaller difference to the nominal position value than the minimum acceptable position value (+x; −y) or the maximum acceptable position value may have the same difference to the nominal position value as the minimum acceptable position value (+/−z).

The acceptable deviation from the nominal position value may be different for the different predefined states or the same for a plurality, such as all, of the predefined states.

The determination of a tolerance criterion may comprise selecting a primary tolerance criterion (ΔP1) if the pilot valve integer is larger than one, i.e. two or more. Thereby, if the pilot valve integer is at least two, a primary tolerance criterion is applied. When the pilot valve integer is larger than one, the valve typically has at least three predefined states, e.g. a closed state, an open state and a seat-lift and/or seat-push state (or two different seat-lift states). The pilot valve integer is typically larger than one when the valve has a closed state, an open state and a seat-lift state (two pilot valves); the valve has a closed state, an open state, a seat-lift state and a seat-push state (three pilot valves); or the valve has a closed state, an open state and two seat-lift states (three pilot valves). These kind of valves typically are linear valves. For these valves a common tolerance criterion is suitable and thus a primary tolerance criterion is applied.

The determination of a tolerance criterion may comprise, if the pilot valve integer is one, assigning, based on a first nominal position value P1 and a second nominal position value P2 of the acquired nominal position values P1, P2, P3, P4, the valve 101, 201, 301, 401 to a valve type TYPE1, TYPE2 among a group of valve types and selecting a secondary tolerance criterion ΔP2 for the valve 101, 201, 301, 401 based on said valve type TYPE1, TYPE2. It is possible to discriminate between different types of valves based on the nominal positions of the valve. The valve controller 102, 202, 302, 402 is configured to perform a self-configuration during the configuration phase, in which the valve controller 102, 202, 302, 402 automatically identifies the valve type based on nominal positions that are measured during the configuration phase and sets the tolerance criterion accordingly.

Figure 6:
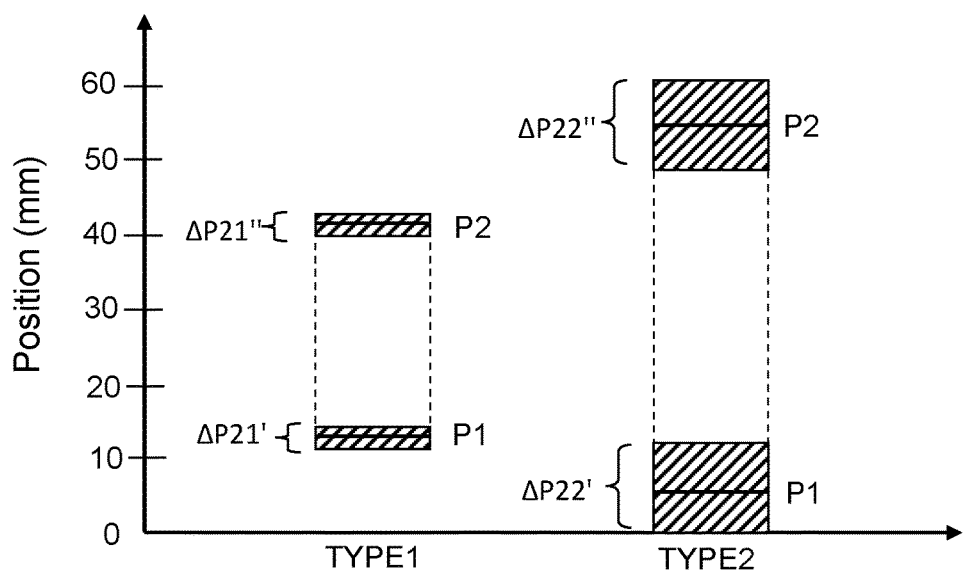
FIG. 6 is a plot of positions acquired for open and closed states in two different types of valves together with associated tolerance criteria.

FIG. 6 illustrates potential position values and tolerance criteria for a linear seat valve (left) and a butterfly valve (right). P1 and P2 indicate first and second nominal positions of the flow controlling element 7, given by the position signal POS, when the valve 1 is in the open state and the closed state, respectively. These first and second nominal positions P1, P2 are measured during the configuration phase, which may be executed when the valve arrangement is first installed in the control network, or after service or maintenance of the valve arrangement. As used herein, position values measured during the configuration phase are denoted "nominal positions" (but may also be denoted "reference positions"), in contrast to position values that are measured during regular operation of the valve arrangement, i.e. during the flow control phase, which are referred to as "current positions". The validation criterion is evaluated based on current positions. As seen in FIG. 6, each of the first and second nominal positions P1, P2 is associated with a respective tolerance band. The tolerance bands are indicated by hatched areas and are designated by ' (prim) for the first nominal position P1 and " (bis) for the second nominal position P2. Generally, and as shown in FIG. 6, the widths of the tolerance bands differ between linear seat valves and butterfly valves. Typically, the tolerance bands are more narrow for a linear seat valve TYPE1 compared to a butterfly valve TYPE2, due to differences in the mechanical precision of linear seat valves compared to butterfly valves. If the pilot valve integer is one, a secondary tolerance criterion ΔP2 is applied. When the pilot valve integer is one, the valve typically has two predefined states, e.g. a closed state and an open state. The pilot valve integer is typically one when the valve only has a closed state and an open state (one pilot valve). These kind of valves may typically be both of linear and rotatable type and are typically single seat valves.

The selection of the secondary tolerance criterion ΔP2 may comprise selecting a first tolerance criterion ΔP21 if the valve is of a first valve type TYPE1, and selecting a second tolerance criterion ΔP22 if the valve is of a second valve type TYPE2. The first valve type TYPE1 may be a linear valve and the second valve type TYPE2 may be a rotatable valve.

If the valve is a linear single-seat valve with only closed state and opened state, i.e. without seat-lift state and seat-push state, it is in a first stage established that the pilot valve integer is one and then the valve is assigned to the first valve type TYPE1 and thus a first tolerance criterion ΔP21 is selected. The first tolerance criterion ΔP21 may be the same as the primary tolerance criterion ΔP1, since both the first tolerance criterion ΔP21 the primary tolerance criterion ΔP1 are associated with linear valves If the valve is a rotatable single-seat valve with only closed state and opened state, i.e. without seat-lift state and seat-push state, it is in a first stage established that the pilot valve integer is one and then the valve is assigned to the second valve type TYPE2 and thus a second tolerance criterion ΔP22 is selected.

Figure 7:
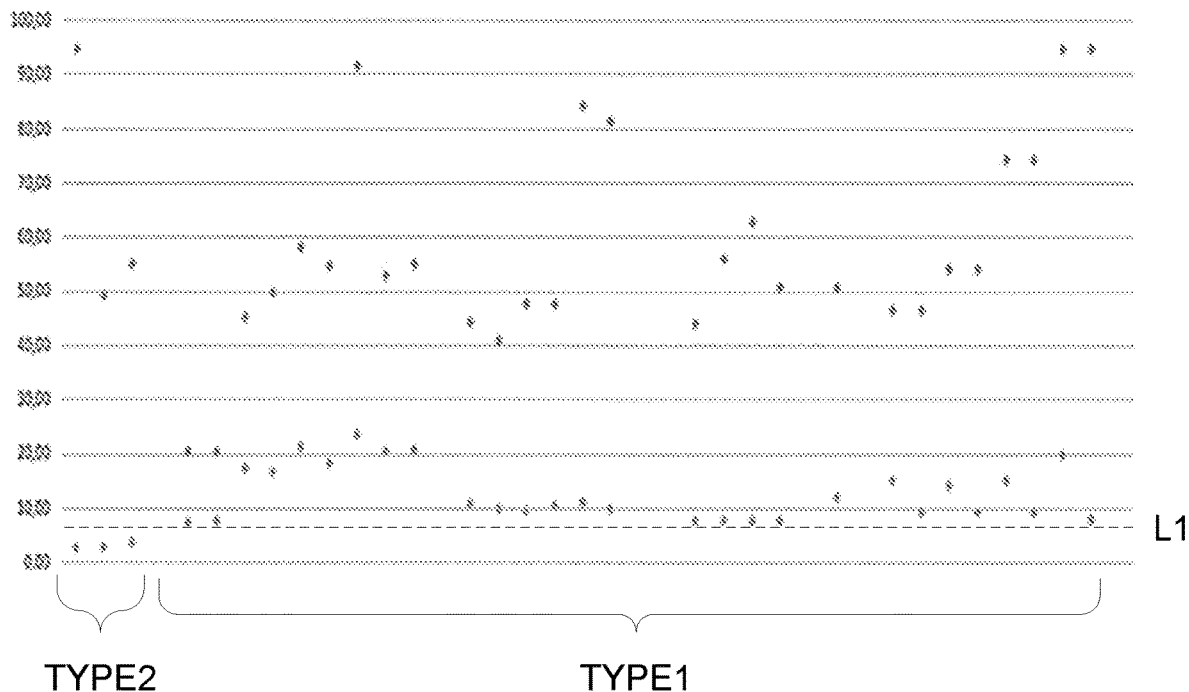
FIG. 7 is a plot of positions for open and closed states of valves of two different types.

To exemplify, FIG. 7 illustrates pairs of nominal positions for different valves belonging to two different valve types, where the vertical axis (left) indicate positions along the sensing range of the position sensor 26. Each column of dots in FIG. 7 represents a different product manufactured by the present applicant. As indicated at the bottom of FIG. 7, there are 3 different valve products of TYPE2, i.e. butterfly valves, and 28 different valve products of TYPE1, i.e. linear seat valves. The lower dot in each pair represents the first nominal position P1, and the upper dot in each pair represents the second nominal position P2. Each dot is obtained as an average for a plurality of items of the respective valve product. FIG. 7 also indicates a limit value L1 that may be used to discriminate between valves of TYPE1 and TYPE2. Accordingly, a valve may be identified as belonging to TYPE2 (butterfly valve) if a first condition C1 is fulfilled, where condition C1 stipulates that the first nominal position P1 is less than the first limit value L1. Otherwise, the valve is identified as belonging to TYPE1 (linear seat valve). In the specific example illustrated in FIG. 7, the first limit value L1 may be set to 7 mm. Alternatively, depending on the outer reference point, the first limit value may be set to about 5-20 mm, such as 7 mm or 10 mm.

To increase the robustness of the identification, a second condition C2 may be applied, which stipulates that the difference between the second and first nominal positions (i.e. the stroke length) is larger than a second limit value (not shown in FIG. 7). If both conditions C1, C2 are fulfilled, the valve is identified as belonging to TYPE2, otherwise as belonging to TYPE1. In the specific example illustrated in FIG. 7, the second limit value L2 may be set to 40 mm.

In some versions, e.g. as in FIGS. 1-6, the first and second nominal positions P1, P2 were defined as being associated with a de-energized and an energized actuator 11, respectively. In FIG. 7, it is presumed that first nominal position P1 is the lower position within the sensing range. However, there are actuators 11 that move the stem to the lower position when energized instead of when de-energized. If such actuators 11 are known to be included among the valves to be used with the valve controller, the first condition C1 may be modified to stipulate that either of the first and second nominal positions P1 should be less than the first limit value L1, for the valve to be identified as a butterfly valve.

The first nominal position value P1 is acquired while said one of said at least one flow controlling element 7 is in a first predefined state, and the second nominal position value P2 is acquired while said one of said at least one flow controlling element 7 is in a second predefined state. Typically, the first nominal position value P1 is acquired while the flow controlling element is in a closed state, and the second nominal position value P2 is acquired while the flow controlling element is in an open state, as discussed above. If the valve comprises two flow controlling elements, it is the first flow controlling element 7' that is in the first and second predefined states, respectively, when the first and second nominal positions, respectively, are acquired.

It is to be understood that the valve may be any type of valve, including on-off valves (normally closed or normally open, or double acting), changeover valves, mixing valves, pressure regulating valves, control valves, sampling valves, etc. The valve may have more one inlet opening and/or more than one outlet opening. The valve may be of any design, including a single-seat valve, a double-seat valve, a butterfly valve, a membrane valve, a ball valve, a plug valve, a knife gate valve, etc. For proper assignment of the valve to a valve type, the valve should include a valve stem performing a movement, preferably a linear movement, indicating the position of the flow controlling element.

As discussed above, the tolerance criterion may involve values having different magnitudes and being set in different relations to the nominal position values. Each selected tolerance criterion may define different acceptable deviating values for different states. For example, the primary tolerance criterion may for a closed state define an acceptable deviation from the nominal position value for the closed state of +3 and −2 (mm) and an the open state define an acceptable deviation from the nominal position value for the open state of +/−2.5 (mm) and an the seat-push state define an acceptable deviation from the nominal position value for the seat-push state of +/−1 (mm). However, each tolerance criterion may define a single acceptable deviation for all states, which also is preferred. Preferably, the tolerance criterion is symmetric in relation to the nominal position values. Preferably, the primary tolerance criterion, which in the examples relates to linear seat valves having at least three states, is +/−1.4 (mm) for all states. Preferably, the first tolerance criterion, which in the examples relates to linear single seat valves having two states, is the same as the preferred primary tolerance criterion, i.e. +/−1.4 (mm) for all states. Preferably, the second tolerance criterion, which in the examples relates to rotatable valves, is +/−5 (mm) for all states. Consequently, preferably, the primary tolerance criterion defines a fine tolerance, the first tolerance criterion defines a (the same) fine tolerance and the second tolerance criterion defines a course tolerance.

The pilot valve integer corresponds to the number of enabled pilot valves. Thereby, the pilot valve integer corresponds to the number of pilot valves that are enabled to operate. The pilot valve integer corresponds to the number of pilot valves that are enabled to operate the actuator. An enabled pilot valve is operational. Thereby, instructions can be given to the enabled pilot valve. An enabled pilot valve is considered to be actively connected to the control unit of the valve controller. The pilot valve integer corresponds to the number of pilot valves actively connected to the control unit. Usually, a pilot valve is enabled when connected to the control unit, more precisely to the processor. Thus, usually the pilot valve integer corresponds to the number of connected pilot valves, i.e. the number of pilot valves connected to the control unit, such as to the processor. The number of said at least one pilot valve may be the number of said at least one pilot valve that is/are enabled.

The valve controller may have more pilot valves than the enabled pilot valves. For example, the valve controller may have three pilot valves, but two of the pilot valves are disabled in order to mount the valve controller on a single seat valve with only closed and open state. This may for example be the case when different kind of valves are present at the same site and it is desired to have identical valve controllers on all valves e.g. for simplicity or if it is desired to only have one type of valve controller on stock as spare part. Usually, a pilot valve is disabled when disconnected from the control unit, more precisely from the processor. Thus, a pilot valve is usually disabled by disconnecting the pilot valve from the control unit, more precisely from the processor.

If a valve controller having three pilot valves is mounted on a single seat valve with only closed and open states only a pressure conduit can be connected between the first pilot valve and the actuator (and no pressure conduit can be connected between the second and third pilot valves and the actuator) and if the second and third pilot valves not have been disabled, the valve controller is configured to detect an error during set-up, which will call on disabling of the second and third pilot valves. Correspondingly, if a valve controller having two pilot valves is mounted on a single seat valve with only closed and open states only a pressure conduit can be connected between the first pilot valve and the actuator (and no pressure conduit can be connected between the second pilot valve and the actuator) and if the second pilot valve not has been disabled, the valve controller is configured to detect an error during set-up, which will call on disabling of the second pilot valve. Further, if a valve controller having three pilot valves is mounted on a single seat valve with only closed state, open state and one seat-lift state only a pressure conduit can be connected between the first pilot valve and the actuator and a pressure conduit between the second pilot valve and the actuator (and no pressure conduit can be connected between the third pilot valve and the actuator) and if the third pilot valve not has been disabled, the valve controller is configured to detect an error during set-up, which will call on disabling of the third pilot valve.

Said at least one pilot valve 25, 37, 72 may be enabled or unenabled. More precisely, any or some of said at least one pilot valve may be unenabled while any or some of said at least one pilot valve is/are enabled, which in particular may be the case if said at least one pilot valve are two or more pilot valves. In case of one or more unenabled pilot valves, i.e. if any or more of said at least one pilot valve is/are unenabled, the pilot valve integer may correspond to the number of enabled pilot valves. In other words, if any or some of said at least one pilot valve is/are unenabled and any or some of said at least one pilot valve is/are enabled, the pilot valve integer may correspond to the number of enables pilot valves, i.e. the number of said at least one pilot valve that is/are enabled.

Figure 8:
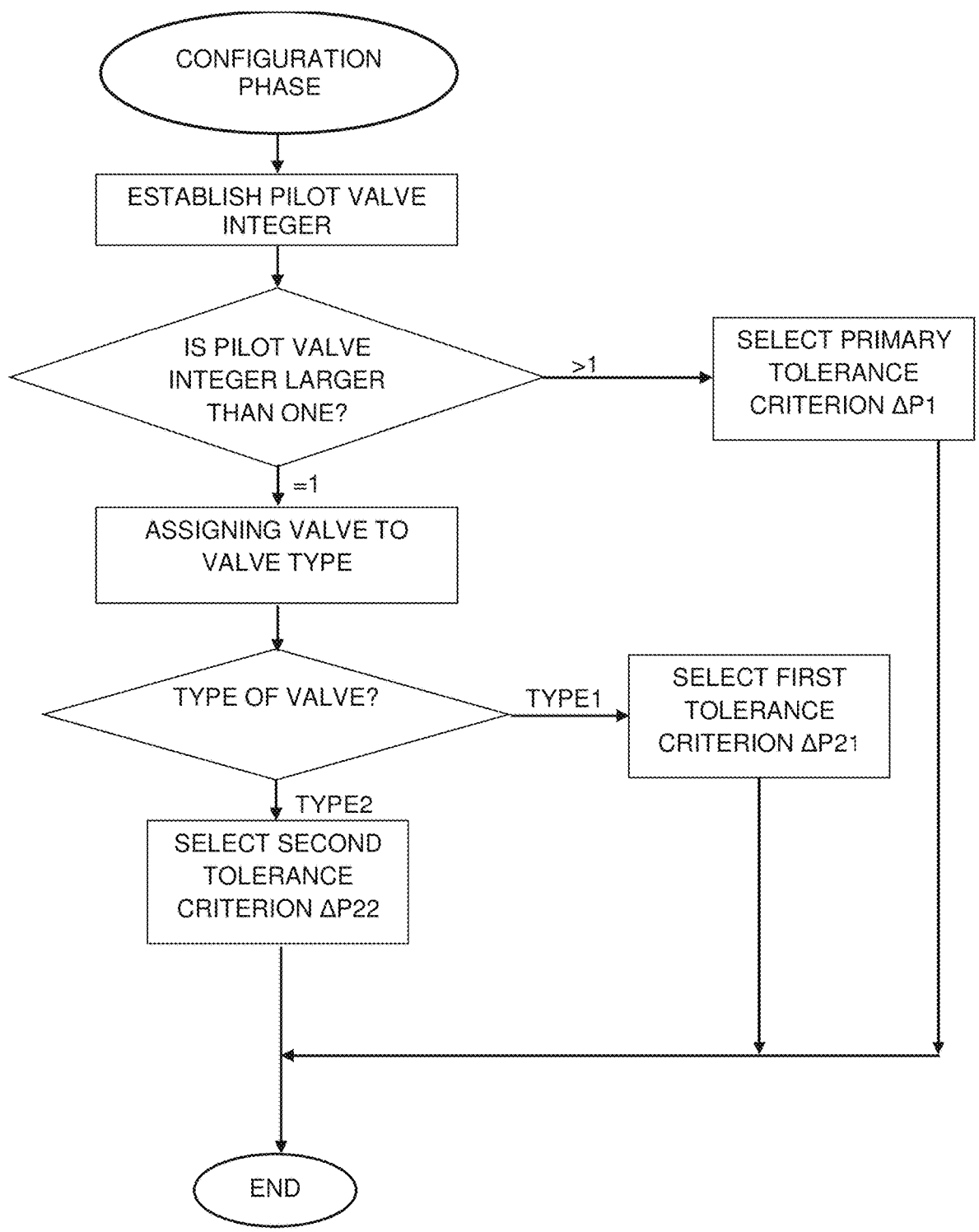
FIG. 8 is a flow chart of a configuration phase.

A configuration phase is illustrated in a flow chart in FIG. 8. In the configuration phase, a pilot valve integer is established. It is then checked if the pilot valve integer is larger than one. If the pilot valve integer is larger than one (>1), i.e. two or more, a primary tolerance criterion $\Delta P1$ is directly selected and no further operations for determining the tolerance criterion is needed. If the pilot valve integer is one (=1), the valve is assigned to a valve type based on the first and second nominal position values as described above. If the valve is of a first type, a first tolerance criterion $\Delta P21$ is selected. If the valve is of a second type, a second tolerance criterion $\Delta P22$ is selected.

By firstly basing the determination of a tolerance criterion on a pilot valve integer, no evaluation of valve type or nominal position values is necessary to select a tolerance criterion if the pilot valve integer is larger than one. Only if the pilot valve integer is one, is it necessary to continue the evaluation and consider the nominal position values and valve types in order to select tolerance criterion. This simplifies the tolerance criteria selection and thus the configuration. It also makes the configuration faster. It also makes the tolerance criterion selection more reliable, since it is not dependent on the measured nominal position values and the differences between nominal position value for different valve types if the pilot valve integer is larger than one and also makes it possible to exclude certain valve models when choosing valve type in a possible valve type assignment.

It can be considered that a secondary tolerance criterion $\Delta P2$ is selected based on the valve type and that the first tolerance criterion $\Delta P21$ represents one criterion and the second tolerance criterion $\Delta P22$ represents another criterion of the secondary tolerance criterion $\Delta P2$.

The valve controller is configured to receive a valve control signal CTRL1 for controlling a fluid flow through the valve 101, 201, 301, 401 and to generate a status signal S. The valve controller 102, 202, 302, 402 is further configured to, subsequent to the configuration phase, perform a flow control phase. The flow controlling phase is performed during operation of the valve and involves checking that the valve arrangement is operating properly. The flow controlling phase comprises controlling the actuator 11 based on the valve control signal CTRL1, and controlling the position of the flow controlling element(s) 7 to set the flow controlling element(s) 7 in one of the predefined states based on the valve control signal CTRL1. Thereby, the valve is set in one of the predefined states (closed state, open state and possibly seat-lift state and/or seat-push state) in response to the valve control signal. The flow controlling phase also comprises evaluating the tolerance criterion $\Delta P1, \Delta P2$. Thereby, it is checked if the valve is in the desired predefined state as requested by the valve control signal. The flow controlling phase further comprises generating the status signal S to indicate an error status if the validation criterion $\Delta P1, \Delta P2$ is violated. Thereby, it is alerted in case the desired predefined state not is obtained. The flow control phase also includes acquiring, from the position signal POS, while the flow controlling element(s) 7 is in said one of the predefined states, a current position value. The tolerance criterion is evaluated by comparing the current position value with the acceptable range of position values, which is based on the nominal position value. It is checked if the valve is in the desired predefined state by comparing the current position value as currently obtained for the desired predefined state with the acceptable range of position values for the desired predefined state. More precisely, the control unit 20 of the valve controller 102, 202, 302, 402 may be configured to receive the valve control signal CTRL1 for controlling a fluid flow through the valve 101, 201, 301, 401 and to generate the status signal S. The control unit 20 may also be configured to perform the flow control phase. In particular, the data processor 21 of the control unit 20 may be configured to receive the valve control signal CTRL1 for controlling a fluid flow through the valve 101, 201, 301, 401 and to generate the status signal S. The data processor 21 may also be configured to perform the flow control phase.

The present invention also relates to a method of controlling a valve 101, 201, 301, 401 that comprises at least one flow controlling element 7 mechanically coupled to an actuator 11 and a valve controller 102, 202, 302, 402 comprising at least one pilot valve 25, 37, 72 for controlling the position of the flow controlling element(s) 7 by energizing the actuator 11 by allowing a pressurized fluid to enter the actuator 11 and de-energizing the actuator 11 by allowing the pressurized fluid to leave the actuator 11, the valve controller 102, 202, 302, 402 comprising a position sensor 26 for obtaining a position signal POS indicative of the position of one 7 of said at least one flow controlling element. The method comprises a configuration phase. The configuration phase comprises establishing a pilot valve integer corresponding to number of pilot valves 25, 37, 72, and determining a tolerance criterion for the position signal based on the pilot valve integer.

The configuration phase of the method comprises controlling the position of the flow controlling element(s) 7 by means of said at least one pilot valve 25, 37, 72 to set the flow controlling element(s) 7 in a plurality of predefined states. The configuration phase of the method also comprises acquiring, from the position signal POS, while the flow controlling element(s) 7 is in at least two of the predefined states, a nominal position value P1, P2, P3, P4 for each of said at least two of the predefined states The method may further involve the above mentioned features, versions and advantages, in particular those mentioned in conjunction with the valve controller. The valve controlled in the method may be a valve as specified above and in conjunction with the valve controller. The method may be a method of controlling a valve arrangement as specified above, e.g. a valve arrangement comprising a valve as defined above and a valve controller as defined above.

While the invention has been described in connection with what is presently considered to be the most practical and preferred embodiments, it is to be understood that the invention is not to be limited to the disclosed embodiments, but on the contrary, is intended to cover various modifications and equivalent arrangements included within the spirit and the scope of the appended claims.

The invention claimed is:

1. A valve controller for a valve that comprises an actuator mechanically coupled to at least one flow controlling element, the valve controller comprising:
one or more pilot valves that, when enabled to operate the actuator, controls a position of the at least one flow controlling element by energizing the actuator by allowing a pressurized fluid to enter the actuator and de-energizing the actuator by allowing the pressurized fluid to leave the actuator,
a position sensor for obtaining a position signal indicative of the position of said at least one flow controlling element, said valve controller being further configured to:
control energization and de-energization of the actuator to control the position of the at least one flow controlling element and set the at least one flow controlling element in at least two different predefined states,
acquire a nominal position value of the at least one flow controlling element in each of the at least two of the predefined states, the nominal position value being a position value of the at least one flow controlling element provided by the position sensor when the at least one flow controlling element is in the respective predefined state during a configuration phase,
establish a pilot valve integer corresponding to the number of the pilot valves that is enabled to operate the actuator,
using the pilot valve integer to determine a tolerance criterion for the position signal, the tolerance criterion defining an acceptable range of position values of the at least one flow controlling element relative to at least one of the nominal position values, the tolerance criteria when the pilot valve integer is more than one being different from the tolerance criteria when the pilot valve integer is one and the at least one flow controlling element is one flow controlling valve type; and
determine that: i) the at least one flow controlling element is in a first of the predefined states when the position value of the at least one flow controlling element is in the acceptable range; and ii) the at least one flow controlling element is not in the first of the predefined states when the position value of the at least one flow controlling element is outside the acceptable range.

2. The valve controller according to claim 1, wherein the acceptable range of position values for the at least one flow controlling element has a predefined relation to the at least one of the nominal position values, and wherein the valve controller is configured to set the acceptable range of position values in the predefined relation to said one of the nominal position values.

3. The valve controller according to claim 1, wherein when the pilot valve integer is one and the at least one flow controlling element is another flow controlling valve type different from the one flow controlling valve type, the valve controller is configured to determine that the tolerance criterion is the same as the tolerance criteria when the pilot valve integer is more than one.

4. The valve controller according to claim 1, wherein when the pilot valve integer is one and the at least one flow controlling element is another flow controlling valve type different from the one flow controlling valve type, the valve controller is configured to determine that the tolerance criterion is different from the tolerance criteria when the pilot valve integer is one and the at least one flow controlling element is the one flow controlling valve type.

5. The valve controller according to claim 4, wherein the valve controller is configured to select one secondary tolerance criterion when the one flow controlling valve type is a butterfly valve, and is configured to select another secondary tolerance criterion when the other controlling valve type is a linear valve.

6. The valve controller according to claim 4, wherein the valve controller is configured to acquire a first nominal position value when the at least one flow controlling element is in a closed state, and
the valve controller is configured to acquire a second nominal position value when the at least one flow controlling element is in an open state.

7. The valve controller according to claim 1, wherein the valve controller comprises a control unit connected to the position sensor and said one or more pilot valves.

8. The valve controller according to claim 1, which is configured to receive a valve control signal for controlling a fluid flow through the valve and to generate a status signal, and wherein the valve controller is further configured to, subsequent to the configuration phase:
- control the actuator based on the valve control signal,
- control the position of the at least one flow controlling element to set the at least one flow controlling element in one of the predefined states based on the valve control signal,
- evaluate the tolerance criterion, and
- generate the status signal to indicate an error status if the validation criterion is violated.

9. A valve arrangement comprising the valve controller according to claim 1, the valve arrangement further comprising a valve, the valve comprising:
- a valve housing,
- at least one inlet opening on the valve housing,
- at least one outlet opening on the valve housing,
- a fluid channel defined in the valve housing to extend between the at least one inlet opening and the at least one outlet opening,
- the at least one flow controlling element arranged for movement in the fluid channel, and
- an actuator mechanically coupled to the at least one flow controlling element and being directly or indirectly controlled by the valve controller to move the at least one flow controlling element in the fluid channel so as to control a fluid flow through the valve housing between the at least one inlet opening and the at least one outlet opening.

10. A method of controlling a valve that comprises at least one flow controlling element mechanically coupled to an actuator, a position of the at least one flow controlling element being controlled by at least one pilot valve that energizes the actuator by allowing a pressurized fluid to enter the actuator and de-energizes the actuator by allowing the pressurized fluid to leave the actuator, the position of said at least one flow controlling element being indicated by a position signal obtained from a position sensor, said method comprising:
- controlling the position of the at least one flow controlling element through operation of the pilot valve to set the at least one flow controlling element in at least two different predefined states,
- acquiring, from the position signal and while the at least one flow controlling element is in the at least two predefined states during a configuration phase, a nominal position value of the at least one flow controlling element in each of the at least two predefined states,
- establishing a pilot valve integer corresponding to a number of pilot valves that are enabled,
- using the pilot valve integer to determine a tolerance criterion for the position signal, the tolerance criterion defining an acceptable range of position values of the at least one flow controlling element relative to at least one of the nominal position values, the tolerance criteria when the integer value is more than one being different from the tolerance criteria when the integer value is one and the at least one flow controlling element is a first valve type; and
- determine that: i) the at least one flow controlling element is in a first of the predefined states when the position value of the at least one flow controlling element is in the acceptable range; and ii) the at least one flow controlling element is not in the first of the predefined states when the position value of the at least one flow controlling element is outside the acceptable range.

11. A valve controller for a to-be-controlled valve that comprises an actuator mechanically coupled to a flow controlling element, the valve controller comprising:
- at least one pilot valve that, when enabled to operate the actuator, controls a position of the flow controlling element by energizing the actuator by allowing a pressurized fluid to enter the actuator and de-energizing the actuator by allowing the pressurized fluid to leave the actuator,
- a position sensor that obtains a position signal indicative of the position of the flow controlling element,
- at least one pilot valve detection circuitry,
- said valve controller being further configured to:
  - control energization and de-energization of the actuator to control the position of the flow controlling element and set the flow controlling element in at least two different predefined states,
  - acquire, from the position sensor, a nominal position value of the flow controlling element in each of the at least two predefined states, the nominal position value being a position value of the flow controlling element provided by the position sensor when the flow controlling element is in the respective predefined state during a configuration phase,
  - establish by way of the at least one pilot valve detection circuitry a pilot valve integer corresponding to the number of the at least one pilot valve that is enabled to operate the actuator,
  - use the pilot valve integer to determine, for the position signal, a tolerance criterion that defines an acceptable range of position values of the flow controlling element relative to at least one of the nominal position values so that: i) the flow controlling element is determined to be positioned at the respective predefined state when the position value of the flow controlling element is in the acceptable range; ii) the flow controlling element is determined to be possibly malfunctioning when the position value of the flow controlling element is outside the acceptable range.

12. The valve controller according to claim 11, wherein the valve controller is configured: i) to determine that the tolerance criterion is a primary tolerance criterion when the pilot valve integer is greater than one; and ii) to determine that the tolerance criterion is a secondary tolerance criterion different from the primary tolerance criterion when the pilot valve integer is one.

13. The valve controller according to claim 12, wherein the valve controller is configured to: i) assign a first one of a plurality of valve types to the to-be-controlled valve when the pilot valve integer established by the pilot valve detection circuitry is one and the nominal position value of the flow controlling element is a first nominal position value; and ii) assign a second one of the plurality of valve types to the to-be-controlled valve when the pilot valve integer established by the pilot valve detection circuitry is one and the nominal position value of the flow controlling element is a second nominal position value, the first one of the plurality of valve types being different from the second one of the plurality of valve types, the first nominal position value being different from the second nominal position value.

14. The valve controller according to claim 12, wherein the valve controller is configured to: i) assign one of a plurality of valve types to the to-be-controlled valve when the pilot valve integer established by the pilot valve detection circuitry is one; and ii) determine the tolerance criterion according to the assigned valve type such that the tolerance criteria for one valve type differs from the tolerance criteria for a different valve type.

* * * * *